(12) United States Patent
Skulason et al.

(10) Patent No.: US 12,275,485 B2
(45) Date of Patent: Apr. 15, 2025

(54) REAR WHEEL SUSPENSION SYSTEM FOR A BIKE

(71) Applicant: LAUF FORKS HF., Reykjavik (IS)

(72) Inventors: Benedikt Skulason, Reykjavik (IS); Bergur Benediktsson, Reykjavik (IS)

(73) Assignee: LAUF CYCLES HF., Reykjavik (IS)

(*) Notice: Subject to any disclaimer, the term of this patent is extended or adjusted under 35 U.S.C. 154(b) by 490 days.

(21) Appl. No.: 17/777,468

(22) PCT Filed: Sep. 4, 2020

(86) PCT No.: PCT/EP2020/074808
§ 371 (c)(1),
(2) Date: May 17, 2022

(87) PCT Pub. No.: WO2021/099000
PCT Pub. Date: May 27, 2021

(65) Prior Publication Data
US 2022/0402572 A1   Dec. 22, 2022

(30) Foreign Application Priority Data
Nov. 18, 2019   (EP) .................................... 19209794

(51) Int. Cl.
B62K 25/04   (2006.01)
(52) U.S. Cl.
CPC ........ B62K 25/04 (2013.01); *B62K 2025/041* (2013.01); *B62K 2201/06* (2013.01)
(58) Field of Classification Search
CPC ................ B62K 25/04; B62K 2201/06; B62K 2025/041
See application file for complete search history.

(56) References Cited

U.S. PATENT DOCUMENTS 4,813,696 A * 3/1989 Moulton ................. B62K 3/02
                                                            280/281.1
5,098,114 A * 3/1992 Jones ..................... B62K 25/30
                                                            280/284
(Continued)

FOREIGN PATENT DOCUMENTS

DE           9207661 U1    8/1992
DE    202014006805 U1   12/2015
(Continued)

OTHER PUBLICATIONS

Chinese Search Report from Corresponding Chinese Patent Application No. CN202080090280.3, Jan. 31, 2024.
(Continued)

*Primary Examiner* — James A English
*Assistant Examiner* — Hosam Shabara
(74) *Attorney, Agent, or Firm* — Workman Nydegger

(57) ABSTRACT

A rear wheel suspension system for a bike, includes a seat tube, left and right side flexible chainstays, left and right side seatstays. A leaf spring interconnects the seatstays and the seat tube, wherein one end of the leaf spring is connected to the upper end area of said seatstays, the leaf spring extending upwardly from its point of connection to the upper end area of the seatstays to a point of connection to the seat tube of said bicycle. The leaf spring is arranged at a distance D to the seat tube in a direction perpendicular to top and bottom surfaces of the leaf spring to allow flex of the leaf spring towards the seat tube and thus vertical flex of said flexible chainstays.

18 Claims, 35 Drawing Sheets

(56) References Cited

U.S. PATENT DOCUMENTS

| | | | |
|---|---|---|---|
| 5,816,356 A | 10/1998 | Jansson et al. | |
| 6,450,520 B1 * | 9/2002 | Girard | B62K 25/286 |
| | | | 280/275 |
| 6,783,142 B1 * | 8/2004 | Schober | B62K 25/28 |
| | | | 280/283 |
| 8,777,250 B1 * | 7/2014 | Yu | B62K 19/18 |
| | | | 280/283 |
| 2004/0145148 A1 | 7/2004 | Klein | |
| 2008/0203700 A1 | 8/2008 | Tseng | |
| 2014/0265231 A1 | 9/2014 | D'Aluisio et al. | |
| 2022/0332387 A1 * | 10/2022 | Skulason | B62K 3/02 |
| 2022/0340230 A1 * | 10/2022 | Skulason | B62K 3/02 |

FOREIGN PATENT DOCUMENTS

| | | | | |
|---|---|---|---|---|
| EP | 1894828 A2 * | 3/2008 | | B62K 19/38 |
| EP | 2960145 A2 | 12/2015 | | |
| GB | 228682 A | 2/1925 | | |
| GB | 261586 A | 11/1926 | | |
| WO | 2008063140 A1 | 5/2008 | | |
| WO | 2015185112 A1 | 12/2015 | | |

OTHER PUBLICATIONS

Search Report from corresponding European Application No. EP 19209794, Apr. 21, 2020.
International Search Report from corresponding PCT Application No. PCT/EP2020/074808, Nov. 4, 2020.

* cited by examiner

REAR WHEEL SUSPENSION SYSTEM FOR A BIKE

FIELD OF THE INVENTION

The present invention relates to a rear wheel suspension system for a bike, and to a bike (bicycles and motorbikes) comprising such a suspension system.

BACKGROUND OF THE INVENTION

Today's rear wheel suspension systems (in contrast to saddle suspension systems such as but not limited to; flexible seatposts, linkage suspension seatposts, suspension saddles, Trek's IsoSpeed® rear system or in general bike frames designed to provide increased seatpost flex) for bikes (bicycles and motorbikes) can mostly be categorized into 3 key categories:

1. 4-bar linkage suspension systems, as seen on most modern "hard-hitting" mountain bikes. Examples are DW-Link®, Niner's CVA®, equipped bikes etc. These systems, when designed correctly, can provide a high degree of suspension dynamics control and/or tuneability while being stiff laterally. These systems however require a supplemental suspension unit (spring of some sort, usually a telescopic coil or air spring with its associated added friction) and further pivots and links to connect and guide the required supplemental suspension unit. These systems are relatively heavy, require substantial maintenance and add complexity to a bike, it's therefore logical to only apply them when substantial suspension travel is needed/desired (this usually means rear wheel travel of above 100 mm). Since these systems are generally designed around the said substantial travel, a damping unit (usually housed within the suspension unit) is also needed in order to "kill" some of the energy the system is charged with during an impact, and thus prevent a violent rebound that would otherwise cause a cyclist discomfort or him to lose control.

2. "Single pivot" suspension systems, as seen on lighter cross-country mountain bikes such as Scott Spark® and Specialized Epic® bikes. These systems generally have far more pivots than just the one implied in their name, however the suspension path of the rear wheel is mostly dictated by a single pivot that is generally placed close to the bottom bracket of its bike. Hence, the name. Further pivots and links are required to connect and guide the required supplemental suspension unit (spring of some sort, usually a telescopic coil or air spring with its associated added friction) this adds substantial weight and maintenance. These "single pivot" systems are generally lighter than "4-bar linkage" systems but offer less control and tuneability of suspension dynamics. Therefore "single pivot" systems are usually used for lower travel applications than "4-bar linkage" systems. However, the weight, maintenance and complexity addition compared to a non-suspended bike frame is still substantial and therefore this solution is rarely used for less than 70 mm of rear wheel travel. Since these systems are generally designed around the said substantial travel, a damping unit (usually housed within the suspension unit) is also needed in order to "kill" some of the energy the system is charged with during an impact, and thus prevent a violent rebound that would otherwise cause a cyclist discomfort or him to lose control. A notable variation of "Single pivot" rear suspension is the one used on previous generation(s) of Cannondale Scalpel bikes where the pivot usually placed close to the bottom bracket was replaced by a flex-zone (living hinge) on the chainstays. In other aspects, these bikes were designed like "single pivot" bikes (with several pivots to connect and guide a telescopic suspension unit) and therefore the general pros/cons associated with "single pivot" suspension frame designs are still valid.

3. Flexible chainstays and seatstays combined with a telescopic suspension unit, without supplemental means of guiding its telescopic suspension units. Hereafter called FlexTelSus in this document. While the "single pivot" systems described above have pivots and links to guide their telescopic suspension unit. FlexTelSus systems include BMC's MTT®, Moot's YBB® and HiRide's ESAS® (as seen on Pinarello Dogma K10s®) rear suspension suspension systems (although ESAS is a slight variation, having an additional pivot above its telescopic suspension unit). These systems are simpler and lighter than aforementioned "single pivot" systems but offer little control of the suspension dynamics and the omission of supplemental links and pivots guiding the suspension unit can result in high stresses and associated high friction in the sliding surfaces of said suspension unit. As a result, these systems are generally not considered to be a good solution for smooth long-stroke suspension. They are therefore generally considered limited to a shorter travel (usually 10-35 mm of rear wheel travel). To change the spring rate of these systems they generally offer replaceable elastomers and or springs but stiffness cannot be tuned in a simpler/quicker manner or on the fly. As these systems include telescopic sliding surfaces, they require maintenance of associated friction surfaces, where said friction can also prevent smooth suspension action. The HiRide ESAS® offers a remote lockout function through the use of a hydraulic valve, but suspension stiffness cannot be altered "on the fly".

The inventor of the present invention has appreciated that there is thus a need for an improved rear wheel suspension system for bikes. In particular, one that offers an appealing combination of adjustability, low friction, low weight, low maintenance, low manufacturing complexity and pleasing aesthetics. In particular, in low-mid travel configurations (up to approx. 80 mm of rear wheel suspension).

SUMMARY OF THE INVENTION

It would be advantageous to achieve an improved rear wheel suspension system for bikes. In particular, one that offers an appealing combination of adjustability, low friction, low weight, low maintenance, low manufacturing complexity and pleasing aesthetics. In particular, in low-mid travel configurations (up to approx. 80 mm of rear wheel suspension).

In general, the invention preferably seeks to mitigate, alleviate or eliminate one or more of the above-mentioned disadvantages of the prior art, singly or in any combination. In particular, it may be seen as an object of the present invention to provide a rear wheel suspension system that solved the above-mentioned problems, or other problems, of the prior art.

To better address one or more of these concerns, in a first aspect of the invention a rear wheel suspension system (101) for a bike, the bike comprising:

a rear wheel (109) with a maximum radius (R), the rear wheel defining a center plane (CP) perpendicular to the rotational axis of the rear wheel and coincident with the ground contact of the rear wheel when said bike is upright on level ground, the rear wheel suspension system (101) comprising:

a seat tube (104), a bottom bracket shell (106) defining a rotational axis (105) extending there through in direction transverse to the center plane (CP), said bottom bracket shell forming part of or being securely fixed to said seat tube (104), a left side flexible chainstay (102) and a right side flexible chainstay (103), extending longitudinally on either side of said center plane (CP), each with its forward end configured for attaching to a lower portion of the seat tube (104) of said bike less than 250 mm from said rotational axis (105) of a bottom bracket shell (106), a left side seatstay (107) and a right side seatstay (108), each having lower end areas connected to posterior end areas of each of said flexible chainstays, and each of said seatstays extending upwardly and forwardly with its opposite end being configured to extend to a position which is outside of the maximum radius (R) of the rotably attached rear wheel (109) and at a distance from an upper portion of said seat tube of said bike, a set of dropouts (110) located where said flexible chainstays and said seatstays interconnect for rotably supporting said rear wheel of said bicycle, a leaf spring (111) interconnecting said seatstays and said seat tube, wherein one end of the leaf spring (111) is connected to the upper end area of said seatstays, and wherein the leaf spring (111) extends upwardly from its point of connection to the upper end area of the seatstays to a point of connection to said seat tube of said bicycle, said leaf spring defining opposite top and bottom surfaces extending transversely to said center plane (CP), wherein the said leaf spring is arranged at a distance D to the seat tube in a direction perpendicular to said top and bottom surfaces of said leaf spring to allow flex of said leaf spring towards said seat tube and thus vertical flex of said flexible chainstays.

Thus, providing vertical suspension of said rear wheel, with good resistance to lateral forces without the use of pivots or sliding surfaces, thus enabling light weight constructions while requiring little or no maintenance. Said vertical suspension being mostly frictionless and thus not requiring large impacts to overcome initial stiction, thereby being very effective at absorbing small hits during riding.

In one embodiment of said rear wheel suspension system, said left side flexible chainstay and said right side flexible chainstay, said left side seatstay and said right side seatstay, said leaf spring and said seat tube of said rear wheel suspension system are all a part of the same non-disassemblable body, this can for example, but not limited to, be achieved by monocoque composite material manufacturing techniques, by bonding of composite material parts or by welding of metal parts.

Thus, no screws, bolts, rivets, pivots, etc. between these parts are adding to the complexity, weight, friction and/or maintenance of the system.

In one embodiment of said rear wheel suspension system, said left side flexible chainstay and said right side flexible chainstay, said left side seatstay and said right side seatstay, said leaf spring and said seat tube of said rear wheel suspension system are made of more than one disassemblable bodies, this can for example, but not limited to, be achieved by bolting together, snapping into place, etc.

Thus, facilitating replaceable components, transition between different materials, easy component supply between companies, etc.

In one embodiment of said rear wheel suspension system, said leaf spring has a solid cross section.

Thus, achieving maximal flexural performance, i.e. weight carrying capacity for a certain amount of possible flex, for a given thickness.

In one embodiment of said rear wheel suspension system, said leaf spring has a hollow cross section.

Thus, allowing for manufacturing methods such as composite material bladder pressured molding and or allowing for a lower weight design.

In one embodiment of said rear wheel suspension system, said seatstays are at least 30% thinner on average in the majority of their upmost lengthwise third than the lower at least $\frac{2}{3}^{rd}$ lengthwise remainder of said seatstays are on average.

Thus, enabling easy deformation of the said majority of upmost length-wise third of said seatstays, thus enabling the lower end of said leaf spring to tilt substantially under load compared to the root of said leaf spring by said seat tube, i.e. enabling said leaf spring to flex more as a cantilever beam from its root at connection to said seat tube, as opposed to taking on a S-shape under load, between said seat tube and said seatstays. As evident from simple beam theory, this enables designs of said leaf spring that are better at carrying a high load at a given amount of maximum wheel travel. Comparison seatstays that would be very thin for their entire length would however result in a relatively flimsy and laterally unstable ride.

In one embodiment of said rear wheel suspension system, said leaf spring and said left and right seat stays are interconnected via a pivot.

Thus, although adding weight and complexity, enabling said leaf spring to flex more as a cantilever beam from its root at connection to said seat tube, as opposed to taking on a S-shape under load, between said seat tube and said seatstays. As evident from simple beam theory, this enables designs of said leaf spring that are better at carrying a high load at a given amount of maximum wheel travel.

In one embodiment of said rear wheel suspension system, said leaf spring and said seatstays do not have a clearly defined transition point, instead a transition area is defined where one gradually morphs into the other, with the upmost part of said seatstays providing substantial leaf spring functionality.

In one embodiment of said rear wheel suspension system, said seat tube and said leaf spring are formed so that the effective spring length of said leaf spring is shortened as the said rear wheel suspension system compresses, by said leaf spring coming into contact with said seat tube at designated one or more locations, direct contact or indirect contact through intermediate bodies such as elastomer materials.

Thus, making for a progressive spring rate suspension system, this being a benefit for riders who want extra sensitive suspension for smaller hits, while having stiffer suspension deeper into the suspension travel.

In one embodiment of said rear wheel suspension system, more than 30% of the length of said top and bottom surfaces of said leaf spring is at any given location less than 12° from being parallel to said seat tube of said bike.

Thus, enabling tight packaging of said leaf spring along said seat tube while providing flex in the desired direction, perpendicularly towards said seat tube, to effectively achieve upwards flex of said flexible chainstays.

In one embodiment of said rear wheel suspension system, more than 50% of the length of said top and bottom surfaces of said leaf spring is at any given location less than 12° from being parallel to said seat tube of said bike.

Thus, enabling tight packaging of said leaf spring along said seat tube while providing flex in the desired direction, perpendicularly towards said seat tube, to effectively achieve upwards flex of said flexible chainstays.

In one embodiment of said rear wheel suspension system, the width of said leaf spring at any given height above ground location is, when looked at from the front, within 10 mm of the width of said seat tube in the same height above ground location.

Thus, achieving good flexural performance, i.e. being able to carry high weight over a large displacement at a good stiffness in the intended flex direction, and good lateral stiffness of said leaf spring with limited obtrusiveness and limited added air resistance.

In one embodiment of said rear wheel suspension system, said rear wheel suspension system further comprises one or more stiffness adjustment elements, such as stiffness adjustment inserts, preferably arranged and secured in place between said leaf spring and said seat tube. Said one or more stiffness adjustment inserts may be secured in place by any applicable fastening methods. The stiffness adjustment inserts may in particular be configured and arranged to adjust the effective spring length of the leaf spring, notably to reduce the effective spring length.

Thus, riders of different body weight and/or with different riding preferences may shorten the effective spring length of said leaf spring and thus increase the spring rate of said rear wheel suspension system.

In one embodiment of said rear wheel suspension system, one or more of said one or more stiffness adjustment inserts are each contacting both said leaf spring and said seat tube when rider is stationary in riding position on said bike.

Thus, changing the initial stiffness of the said rear wheel suspension system.

In one embodiment of said rear wheel suspension system, one or more of said one or more stiffness adjustment inserts are each contacting only either said leaf spring or said seat tube when rider is stationary in riding position on said bike, then each contacting both said leaf spring and said seat tube when further compressed into its suspension travel.

Thus, when only partially reaching between said seat tube and said leaf spring said one or more stiffness adjustment inserts can make for a progressive spring rate suspension system, as the said one or more inserts can come into contact with both sides when the suspension system has partially compressed and thereby decreasing the effective spring length, this is a benefit for riders who want extra sensitive suspension for smaller hits, while having stiffer suspension deeper into the suspension travel.

In one embodiment of said rear wheel suspension system, one or more of said one or more stiffness adjustment inserts are elevatable in a direction substantially perpendicularly to said top and bottom surfaces of said leaf spring; either secured to said leaf spring and adjustable in how far they are elevated towards said seat tube, or secured to said seat tube and adjustable in how far they are elevated towards said leaf spring, said one or more stiffness adjustment inserts being secured in place by any applicable fastening method.

Thus, when fully reaching the opposite side, with a rider stationary in riding position on said bike, shortening the effective spring length of said leaf spring and thus stiffening the suspension, making it suit riders preferring stiffer suspension, when partially reaching the opposite side the said elevatable stiffness adjustment insert can make for a progressive spring rate suspension system, as the said elevatable stiffness adjustment insert comes into contact with the opposite side when the suspension system has partially compressed, this is a benefit for riders who want extra sensitive suspension for smaller hits, while having stiffer suspension deeper into the suspension travel.

In one embodiment of said rear wheel suspension system comprising said one or more elevatable stiffness adjustment inserts, one or more of said one or more elevatable stiffness adjustment inserts can be elevated by actuators such as, but not limited to, hydraulic pistons, screw jacks, etc. Said actuators can, e.g. but not limited to, be manually operated via buttons, levers, turn knobs, dials or with a tool such as an Allen key or screwdriver. Operation of said actuators can be via a cable- or hydraulically connected remote, furthermore, said actuators can e.g. be driven by electric motors, either controlled via an electrical wire connected remote or via a wireless remote. Said cable-, hydraulic-, electrical wire- or electrical wireless-remotes can for instance be mounted on the handlebar of said bike.

In one embodiment of said rear wheel suspension system, said top and bottom surfaces of said leaf spring are substantially parallel to the adjacent surface of said seat tube on the lengthwise portion of said leaf spring that reaches from where said leaf spring and seat tube connect, at the root of said leaf spring, to a portion at least 30% downwards along the length of said leaf spring.

As used herein, the feature "substantially parallel" in particular means that the top and bottom surfaces of the leaf spring define an angle relative to the adjacent surface of the seat tube of at most 6 degrees, such as an angle of at most 4 degrees, such as an angle of at most 2 degrees. Angles in these ranges allow the stiffness adjustment insert to fulfil its purpose by being able to reach between the surfaces of the leaf spring and the seat tube over the lengthwise portion of said leaf spring that reaches from where said leaf spring and seat tube connect at the root of said leaf spring, to the position at least 30% upwards along the length of the leaf spring.

It will thus be appreciated that the top and bottom surfaces of the leaf spring need not be completely parallel with the adjacent surface of the seat tube; for example, the leaf spring may be shaped and configured such that it pre-loads (or compresses) the slidable insert slightly. The gap between the spring and the seat tube may thus be slightly narrower away from the spring root than at the spring root. Thus, when the insert slides away from the spring root, it provides an outwardly directed biasing force to the spring to displace it by a few millimeters or less, e.g., at most 5 mm, such as preferably at most 2 mm.

In one embodiment of said rear wheel suspension system, said top and bottom surfaces of said leaf spring are substantially parallel to the adjacent surface of said seat tube on the lengthwise portion of said leaf spring that reaches from where said leaf spring and seat tube connect, at the root of said leaf spring, to a portion at least 30% downwards along the length of said leaf spring, in this said substantially parallel lengthwise portion of said top and bottom surfaces of said leaf spring the substantially perpendicular distance E between said leaf spring and said seat tube being between 1 mm and 40 mm, such as 5-20 mm.

Thus, creating "real estate" for slidable stiffness adjustment inserts between said leaf spring and said seat tube. Said slidable stiffness adjustment inserts able to slide upwards and downwards along said leaf spring and seat tube to tune the stiffness of said rear wheel suspension system.

In one embodiment of said rear wheel suspension system, where said top and bottom surfaces of said leaf spring are substantially parallel to the adjacent surface of said seat tube on the lengthwise portion of said leaf spring that reaches from where said leaf spring and seat tube connect, at the root of said leaf spring, and from there to a portion at least 30% downwards along the length of said leaf spring. Preferably, said leaf spring is substantially straight in said portion at least 30% downwards along the length of said leaf spring.

Thus, allowing for straight linear actuators to be used, that would not be able to function along significantly curved leaf springs, such as screw jack actuators.

In one embodiment of said rear wheel suspension system, said perpendicular distance E is achieved through a kink in the shape of said leaf spring at its root, above said portion of said leaf spring where it is substantially parallel to the adjacent surface of said seat tube.

In one embodiment of said rear wheel suspension system, said perpendicular distance E is achieved through said leaf spring connecting to the posterior part of a posteriorly elevated portion of said seat tube, elevated perpendicularly from said seat tube as it is in the said substantially parallel lengthwise portion of said top and bottom surfaces of said leaf spring.

Whether said perpendicular distance E is e.g. achieved through said kink in the shape of said leaf spring, via a said posteriorly elevated portion of the said seat tube, a combination of the two, or any other comparable methods, said body achieving said perpendicular distance E is defined as a part of the root of said leaf spring.

In one embodiment of said rear wheel suspension system, one or more of said one or more stiffness adjustment inserts are slidable upwards and downwards along and between said leaf spring and said seat tube. Said one or more slidable stiffness adjustment inserts are preferably guided to prevent lateral movement. When the rider is stationary in riding position on said bike said one or more slidable stiffness adjustment inserts can either reach entirely between said leaf spring and said seat tube, or reach partially between said leaf spring and said seat tube.

Thus, when reaching entirely between the said leaf spring and seat tube shortening the effective spring length of said leaf spring and thus stiffening the suspension, when partially reaching between the said leaf spring and said seat tube the said one or more slidable stiffness adjustment inserts may confer a progressive spring rate suspension system, as the said insert achieves contacts with both said leaf spring and said seat tube when the suspension system has partially compressed, this is a benefit for riders who want extra sensitive suspension for smaller hits, while having stiffer suspension deeper into the suspension travel. Being slidable upwards/downwards can enable a rider to conveniently adjust his suspension according to his preference.

In one embodiment of said rear wheel suspension system comprising said one or more slidable stiffness adjustment inserts, said one or more slidable stiffness adjustment inserts are between 5-40 mm long, i.e. in the upwards/downwards direction.

In one embodiment of said rear wheel suspension system, comprising said one or more slidable stiffness adjustment inserts, one or more of said one or more slidable stiffness adjustment inserts comprise a mechanically gripping texture A that interacts with a matching opposing mechanically gripping texture B on said leaf spring and or on said seat tube, said one or more mechanically gripping slidable stiffness adjustment inserts further comprising means of pressuring said opposing mechanically gripping textures A and B together, said pressuring may be done via, but not limited to, spring loading, screw tightening, etc.

Thus, preventing said one or more mechanically gripping slidable stiffness adjustment inserts from slipping unintentionally upwards or downwards along said leaf spring and seat tube during riding of said bike.

In one embodiment of said rear wheel suspension system, said pressuring of said opposing mechanically gripping textures A and B together is achieved through a spring-loaded lever, where pushing or pulling the lever levitates said pressure and thus allows said slidable stiffness adjustment insert to be slid upwards or downwards while lever is pushed or pulled.

In one embodiment of said rear wheel suspension system comprising said one or more slidable stiffness adjustment inserts, said rear wheel suspension system further comprises a linear actuator for sliding one or more of said one or more slidable stiffness adjustment inserts upwardly and downwardly. Said linear actuator can e.g. be a screw jack, scissor drive, rack and pinion drive, hydraulic actuator, pneumatic actuator, pullable wire plus retracting spring combo, etc.

In one embodiment of said rear wheel suspension system comprising said linear actuator, said linear actuator extends downwards from said one or more of said one or more slidable stiffness adjustment inserts and then connects its other end, directly or via an intermediate body, to the remainder of said bike, e.g. said leaf spring or said seat tube.

In one embodiment of said rear wheel suspension system comprising said linear actuator, said linear actuator is arranged in a groove that runs up and down the posterior surface of said seat tube (with the notable exclusion of a scissor drive linear actuator, as it would not easily fit in a groove).

Thus, moving said linear actuator out of the way from a flexing leaf spring, allowing more flex of said leaf spring than otherwise possible.

In one embodiment of said rear wheel suspension system comprising said linear actuator, where said linear actuator is arranged in a groove that runs up and down the posterior surface of said seat tube (with the notable exclusion of a scissor drive linear actuator, as it would not easily fit in a groove) said one or more of said one or more slidable stiffness adjustment inserts have an extrusion shaped to interact laterally with the surface of said groove.

Thus, simultaneously moving said linear actuator out of the way from a flexing leaf spring, allowing more flex than otherwise possible, and preventing lateral movement of said one or more slidable inserts.

In one embodiment of said rear wheel suspension system comprising said linear actuator, said linear actuator extends downwards from said one or more of said one or more slidable stiffness adjustment inserts and then extending further through an opening on the posterior surface of said seat tube, into a cavity in said seat tube.

Thus, allowing space-demanding mechanical parts of said linear actuator to be placed in said seat tube, thereby not intruding into the valuable flex zone of said leaf spring or the valuable space required for the rear wheel of said bike.

In one embodiment of said rear wheel suspension system, there is a hole up into said root of said leaf spring that provides linear actuators that reach upwards from said one or more of said one or more slidable stiffness adjustment inserts with access to added space above where said leaf spring reaches said seat tube.

Thus, enabling said one or more of said one or more slidable inserts to slide closer to said root of said leaf spring than would otherwise be possible using said upwards reaching linear actuator, as said linear actuator can reach into said hole.

In one embodiment of said rear wheel suspension system, there is a hole up through said root of said leaf spring that provides linear actuators that reach upwards from said one or more of said one or more slidable stiffness adjustment inserts with access to added space above where said leaf spring reaches said seat tube.

Thus, enabling said one or more of said one or more slidable inserts to slide closer to said root of said leaf spring than would otherwise be possible using said upwards reaching linear actuator, as said linear actuator can reach through said hole. This configuration gives access to practically unlimited space, outside the envelope of the bike frame itself, for mechanism associated with said linear actuator. Furthermore, this configuration allows for easy tool access from above, such as when using an allen key to drive a screw jack.

In one embodiment of said rear wheel suspension system, wherein said linear actuator is arranged in a groove that runs up and down the posterior surface of said seat tube, with said one or more of said one or more slidable stiffness adjustment inserts having an extrusion shaped to interact laterally with the surface of said groove, said linear actuator is a screw jack with the input torque applied from above through said hole through said root of said leaf spring, the linear actuator action taking place through threads in said slidable stiffness adjustment insert.

In one embodiment of said rear wheel suspension system, said linear actuators can, e.g. but not limited to, be manually operated via buttons, levers, turn knobs, dials or with a tool such as an allen key or screwdriver. Operation of said actuators can be via a cable- or hydraulically connected remote. Furthermore, said actuators can e.g. be driven by electric motors, either controlled via an electrical wire connected remote or via a wireless remote. Said cable-, hydraulic-, electrical wire- or electrical wireless-remotes can for instance be mounted on the handlebar of said bike.

In one embodiment of said rear wheel suspension system, comprising said one or more slidable stiffness adjustment inserts comprise a wheel or pinion that interacts with cogged or toothed bars or rails that are fixed to said leaf spring and/or seat tube and extend upwards/downwards along said leaf spring and/or seat tube. Thus, a linear actuator is a rack and pinion system that comprises a wheel or pinion mounted on one or more of said one or more slidable stiffness adjustment inserts that interacts with cogged or toothed racks/bars or rails that are fixed to said leaf spring and/or seat tube and extending upwards/downwards along said leaf spring and/or seat tube.

Thus, by turning said wheel or pinion driving said one or more slidable stiffness adjustment inserts upwards/downwards, said wheel or pinion moving upwards/downwards with said slidable stiffness adjustment insert, and thus altering the stiffness of said rear wheel suspension system by lengthening/shortening the effective spring length of said leaf spring.

In one embodiment of said rear wheel suspension system, comprising said one or more slidable stiffness adjustment inserts, said linear actuator is a rack and pinion system that comprises a wheel or pinion mounted to either said seat tube or said leaf spring, then interacting with cogged or toothed racks/bars or rails that are fixed to one or more of said one or more slidable inserts extending upwards/downwards along said leaf spring and/or seat tube.

Thus, by turning said wheel or pinion driving said one or more slidable stiffness adjustment inserts up/down, while said wheel or pinion does not move upwards/downwards itself relatively to said leaf spring and said seat tube, and thus altering the stiffness of said rear wheel suspension system by lengthening/shortening the effective spring length of said leaf spring.

In one embodiment of said rear wheel suspension system, comprising said wheel or pinion and said one or more cogged or toothed racks/bars or rails, said wheel or pinion is connected to a drive mechanism operated via, but not limited to, a button, a lever, a turn knob, a dial or via a tool such as an allen key or screwdriver, operation can e.g. be via a cable- or hydraulically connected remote, or in the case when said drive mechanism is powered by one or more electric motors, either via electrical-wire connected remote or via wireless remote, said remotes, weather they are connected by a cable-, hydraulic line, electrical wire- or electrical wireless communications, can for instance be mounted on the handlebar of said bike.

In one embodiment of said rear wheel suspension system, comprising one or more stiffness adjustment inserts, one or more of said one or more stiffness adjustment inserts are formed so that the thickness of said one or more of said one or more stiffness adjustment inserts at the end that is closer to the root of said leaf spring is such that, when rider is stationary in riding position on said bike, it reaches entirely between said leaf spring and said seat tube, while its thickness at the end further away from the root of said leaf spring is such that it lacks up to 5 mm to reach entirely between said leaf spring and seat tube.

This can make each of said one or more of said one or more stiffness adjustment inserts provide more than one spring rate for said rear wheel suspension system, i.e. providing progressive stiffness. Stiffness ramping up as the end further away from the intersection of said leaf spring and seat tube comes in contact with both said leaf spring and seat tube, as the said suspension system has been partially compressed.

Generally, in preferred embodiments of the invention, the seatstays are connected to the seat tube solely via the leaf spring and the optional stiffness adjustment insert, with no other elements interconnecting the seat stays and the seat tube. Such embodiments save weight, do not add other connections that could slow down the suspension response and/or add maintenance and are simple and inexpensive, given that a minimum of parts are needed.

In one embodiment of said rear wheel suspension system comprising said one or more stiffness adjustment inserts, said rear wheel suspension system further comprises a liner material fully or partially covering surfaces of said leaf spring and or said seat tube that otherwise could come into contact with each other and or into contact with one or more of said one or more stiffness adjustment inserts, said liner material can be made of, but is not limited to, titanium, steel, a plastic or elastomer material, said liner material is defined to become a part of the body it is attached to, whether it being said leaf spring or said seat tube.

Thus, protecting said leaf spring and/or said seat tube from friction and/or wear and potentially providing a smoother engagement of said one or more stiffness adjustment inserts.

In one embodiment of said rear wheel suspension system, an elastomer bump stop is located and secured in place between said leaf spring and said seat tube.

Thus, enabling a rear wheel suspension system design with a relatively low spring rate without it resulting in harsh bottom outs.

In one embodiment of said rear wheel suspension system, said rear wheel suspension system further comprises a forwardly extending damper arranged from said seatstays to said seat tube.

Thus, further control of the dynamics of the suspension is provided by means of absorbing compression and/or rebound energy, this becomes desirable when said rear wheel suspension system is used to achieve relatively long travel suspension. As a rough reference, this is often considered to happen when suspension travel reaches approximately 40-70 mm.

In one embodiment of said rear wheel suspension system, said left side flexible chainstay and said right side flexible chainstay connect to said seat tube between 100 mm and 250 mm above the rotational axis of the bottom bracket area of said bike, both said left side flexible chainstay and said right side flexible chainstay connecting to said seat tube at substantially the same height.

Thus, potentially freeing up space to fit wider tires on said bike without said tires interfering with crankset of said bike, and furthermore changing the movement path of the suspended said rear wheel so that the movement is more directed rearwards than it would otherwise be if chainstays were connected lower to said seat tube, this can help with small bump compliance and it can also help reducing pedal bob, as chain tension can work against the suspension movement of said rear wheel suspension system in this configuration.

In one embodiment of said rear wheel suspension system, said one or more stiffness adjustment inserts have their widths extending at least essentially between the left and right edge of said leaf spring.

Thus, an adjustable rear wheel suspension system is provided that does not roll excessively to the sides when the rider is pedaling or maneuvering.

According to a second aspect, the present invention relates to a bike comprising said rear wheel suspension system.

Throughout this document a bike can mean; a conventional pedal powered bicycle, motor assisted pedal powered bicycle or a motor bike.

Throughout this document it is assumed that the bike, including said suspension system, is unless otherwise specified in an upright position with both front and rear wheels resting on horizontal ground with the rotational axis of the wheels parallel to the ground.

Throughout this document said seatstays are not to be understood as being fully rigid non-flexible structures. Said seatstays are e.g. to be understood as being shaped roughly according to common practice in today's bicycles, unless stated otherwise. This way, said seatstays preferably flex a bit during the suspension movement of said rear wheel suspension system, thus decreasing required strain on said flexible chainstays and/or said leaf spring.

Throughout this document said flexible chainstays are not to be understood as being excessively flexible structures or outlandishly shaped. Said flexible chainstays are e.g. to be understood as being shaped roughly according to common practice in today's bicycles, but potentially slightly lower in build height than most commonly seen, to allow for more vertical flex.

Throughout this document, said seatstays, said chainstays, said dropout, said seat tube, said leaf spring and said one or more stiffness adjustment inserts can be made out of, but not limited to being made out of, e.g. composite materials such as epoxy reinforced carbon fiber or glass fiber, aluminum, steel, titanium, plastic materials, elastomers, wood, etc.

In general, the various aspects of the invention may be combined and coupled in any way possible within the scope of the invention. These and other aspects, features and/or advantages of the invention will be apparent from and elucidated with reference to the embodiments described hereinafter.

DESCRIPTION OF EMBODIMENTS

The present invention relates to an improved rear wheel suspension system for bikes. In particular, one that offers an appealing combination of adjustability, low friction, low weight, low maintenance, low manufacturing complexity and pleasing aesthetics. In particular, in low-mid travel configurations (up to approx. 80 mm of rear wheel suspension).

Figure 1:
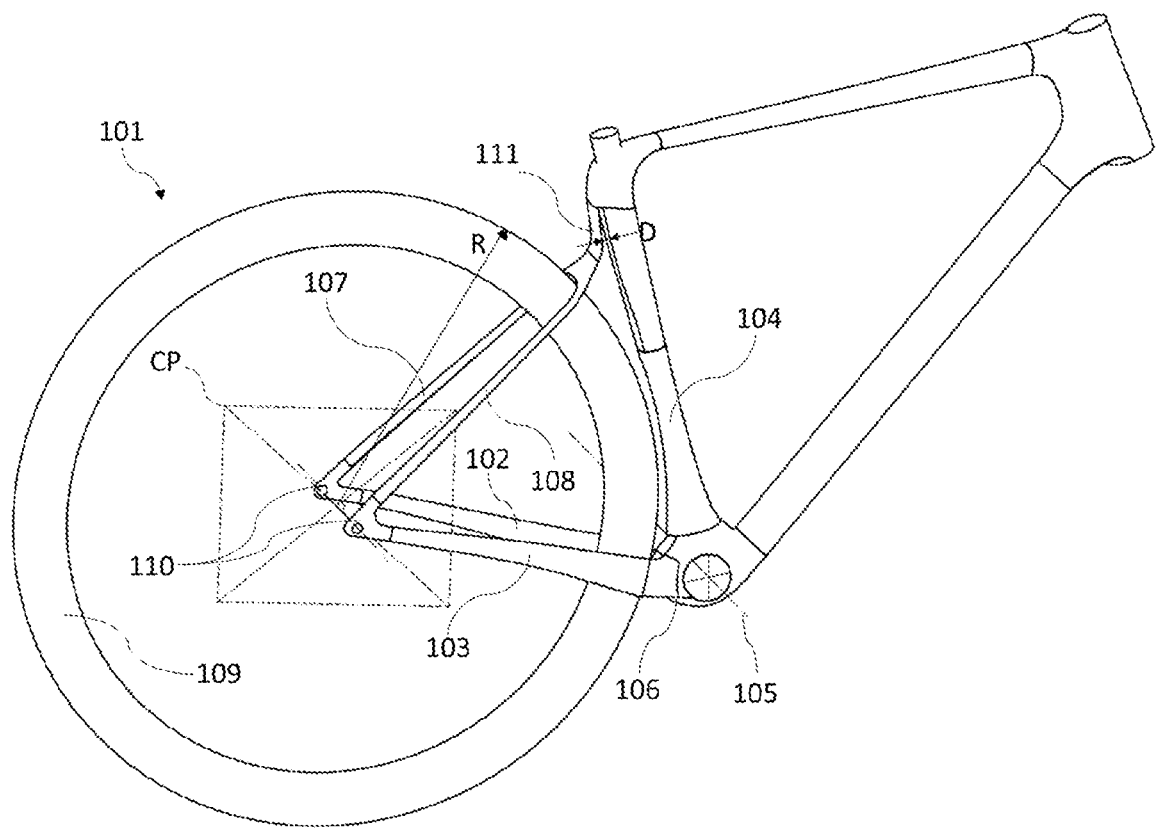
FIGS. 1-6 show different embodiments of non-adjustable rear wheel suspension systems according to the present invention.

FIG. 1 shows a rear wheel suspension system (101) for a bike, the bike comprising:
- a rear wheel (109) with a maximum radius (R), the rear wheel defining a center plane (CP) perpendicular to the rotational axis of the rear wheel and coincident with the ground contact of the rear wheel when said bike is upright on level ground, the rear wheel suspension system (101) comprising:
- a seat tube (104),
- a bottom bracket shell (106) defining a rotational axis (105) extending there through in direction transverse to the said center plane (CP), said bottom bracket shell forming part of or being securely fixed to said seat tube (104),
- a left side flexible chainstay (102) and a right side flexible chainstay (103), extending longitudinally on either side of said center plane CP, each with its forward end configured for attaching to a lower portion of the seat tube (104) of said bike less than 250 mm from said rotational axis (105) of a bottom bracket shell (106),
- a left side seatstay (107) and a right side seatstay (108), each having lower end areas connected to posterior end areas of each of said flexible chainstays, and each of said seatstays extending upwardly and forwardly with its opposite end being configured to extend to a position which is outside of the maximum radius (R) of the rotably attached rear wheel (109) and at a distance from an upper portion of said seat tube of said bike,
- a set of dropouts (110) located where said flexible chainstays and said seatstays interconnect for rotably supporting said rear wheel of said bicycle,
- a leaf spring (111) interconnecting said seatstays and said seat tube, wherein one end of the leaf spring (111) is connected to the upper end area of said seatstays, and wherein the leaf spring (111) extends upwardly from its point of connection to the upper end area of the seatstays to a point of connection to said seat tube of said bicycle, said leaf spring defining opposite top and bottom surfaces extending transversely to said center plane (CP), wherein the said leaf spring is arranged at a distance D to the seat tube in a direction perpendicular to said top and bottom surfaces of said leaf spring to allow flex of said leaf spring towards said seat tube and thus vertical flex of said flexible chainstays.

Thus, providing vertical suspension of said rear wheel, with good resistance to lateral forces without the use of pivots or sliding surfaces, thus enabling light weight constructions while requiring little or no maintenance. Said vertical suspension being mostly frictionless and thus not requiring large impacts to overcome initial stiction, thereby being very effective at absorbing small hits during riding.

In one embodiment of said rear wheel suspension system, said left side flexible chainstay and said right side flexible chainstay, said left side seatstay and said right side seatstay, said leaf spring and said seat tube of said rear wheel suspension system are all a part of the same non-disassemblable body, this can for example, but not limited to, be achieved by monocoque composite material manufacturing techniques, by bonding of composite material parts or by welding of metal parts.

Thus, no screws, bolts, rivets, pivots, etc. between these parts are adding to the complexity, weight, friction and/or maintenance of the system.

In one embodiment of said rear wheel suspension system, said left side flexible chainstay and said right side flexible chainstay, said left side seatstay and said right side seatstay, said leaf spring and said seat tube of said rear wheel suspension system are made of more than one disassemblable bodies, this can for example, but not limited to, be achieved by bolting together, snapping into place, etc.

Thus, facilitating replaceable components, transition between different materials, easy component supply between companies, etc.

In one embodiment of said rear wheel suspension system, said leaf spring has a solid cross section.

Thus, achieving maximal flexural performance, i.e. weight carrying capacity for a certain amount of possible flex, for a given thickness.

In one embodiment of said rear wheel suspension system, said leaf spring has a hollow cross section.

Thus, allowing for manufacturing methods such as composite material bladder pressured molding and or allowing for a lower weight design.

Figure 2A:
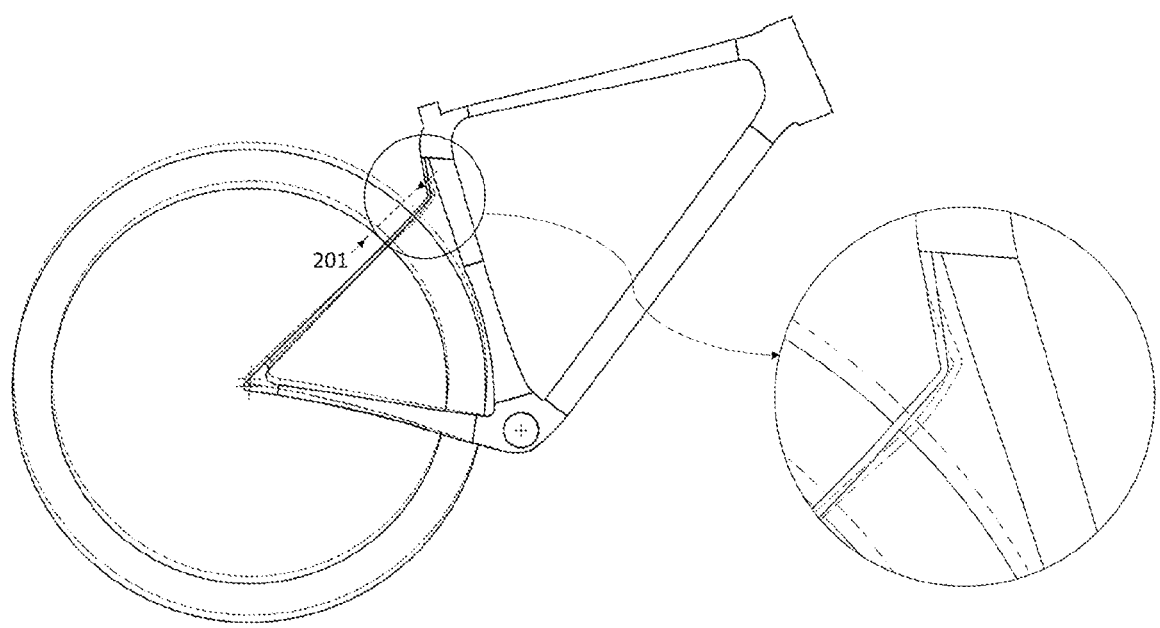
Figure 2B:
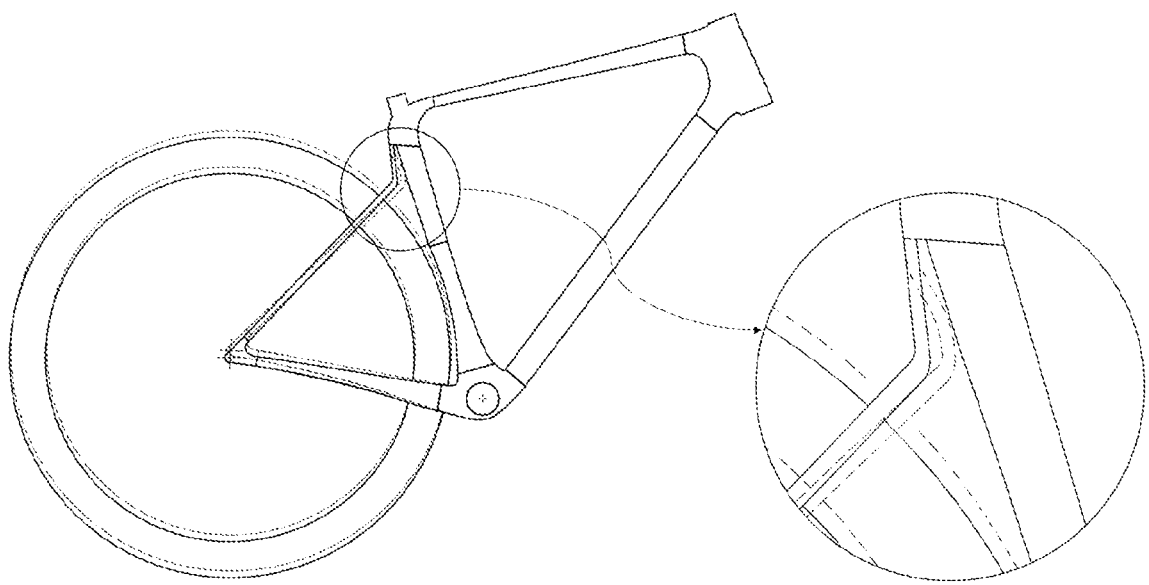

FIGS. 2a and 2b. FIG. 2a shows deformation under load of an embodiment of said rear wheel suspension system, where said seatstays are at least 30% thinner on average in the majority of their upmost length-wise third 201, when said bike is looked at directly from the left or right, than the lower at least $\frac{2}{3}^{rd}$ length-wise remainder of said seatstays are on average. While FIG. 2b shows deformation under load where said seatstays have a uniform higher thickness and thus force said leaf spring to flex into an S-shape rather than flexing as a simple cantilever beam.

Thus, in FIG. 2a enabling easy deformation of the said majority of upmost length-wise third of said seatstays, thus enabling the lower end of said leaf spring to tilt substantially under load compared to the root of said leaf spring by said seat tube, i.e. enabling said leaf spring to flex more as a cantilever beam from its root at connection to said seat tube, as opposed to taking on a S-shape under load, between said seat tube and said seatstays. As evident from simple beam theory, this enables designs of said leaf spring that are better at carrying a high load at a given amount of maximum wheel travel, as the said leaf spring can be made thicker in this configuration and thus stronger, while still providing the required flex. Comparison seatstays that are thin for their entire length would however result in a relatively flimsy ride feel, as they would not pinpoint the flex of said seatstays to the desired location in the top $3^{rd}$ but rather distribute it over its entire length.

Figure 3:
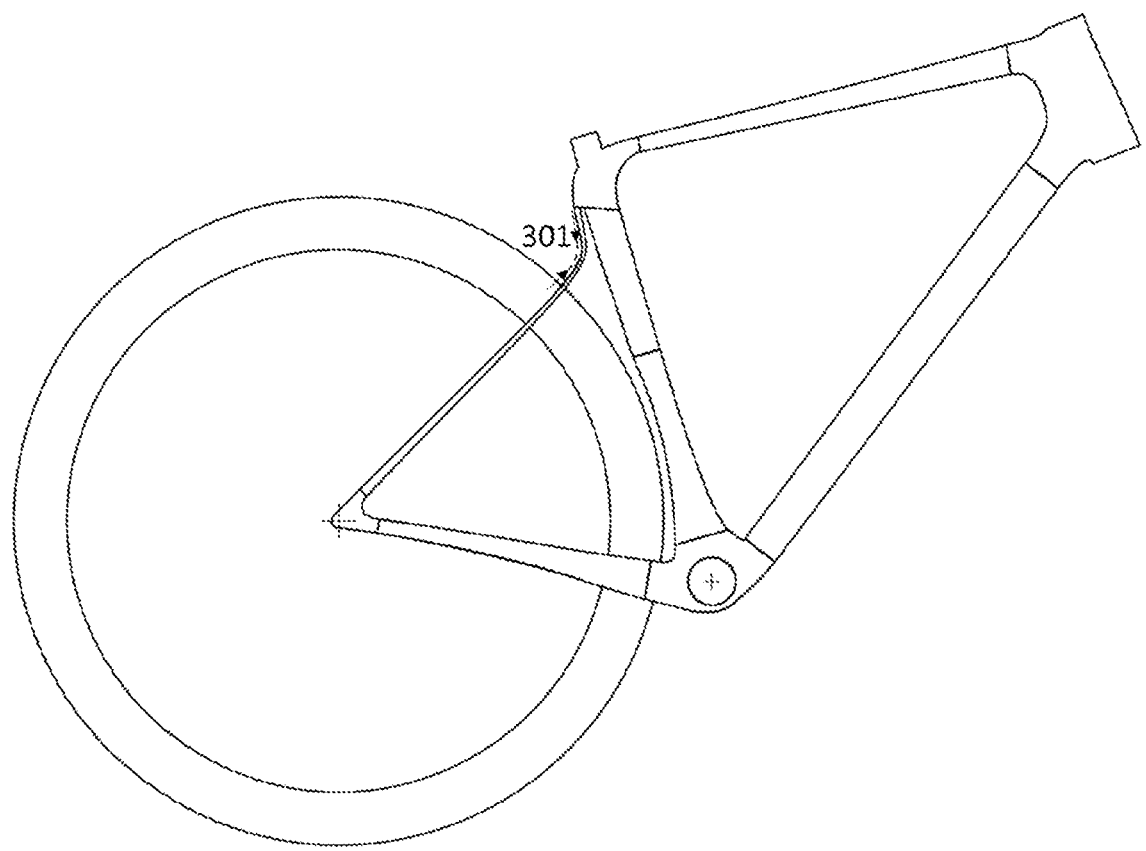

FIG. 3 shows an embodiment of said rear wheel suspension system, where said leaf spring and said seatstays do not have a clearly defined transition point, instead a transition area 301 is defined where one gradually morphs into the other, with the upmost part of said seatstays providing substantial leaf spring functionality.

Figure 4:
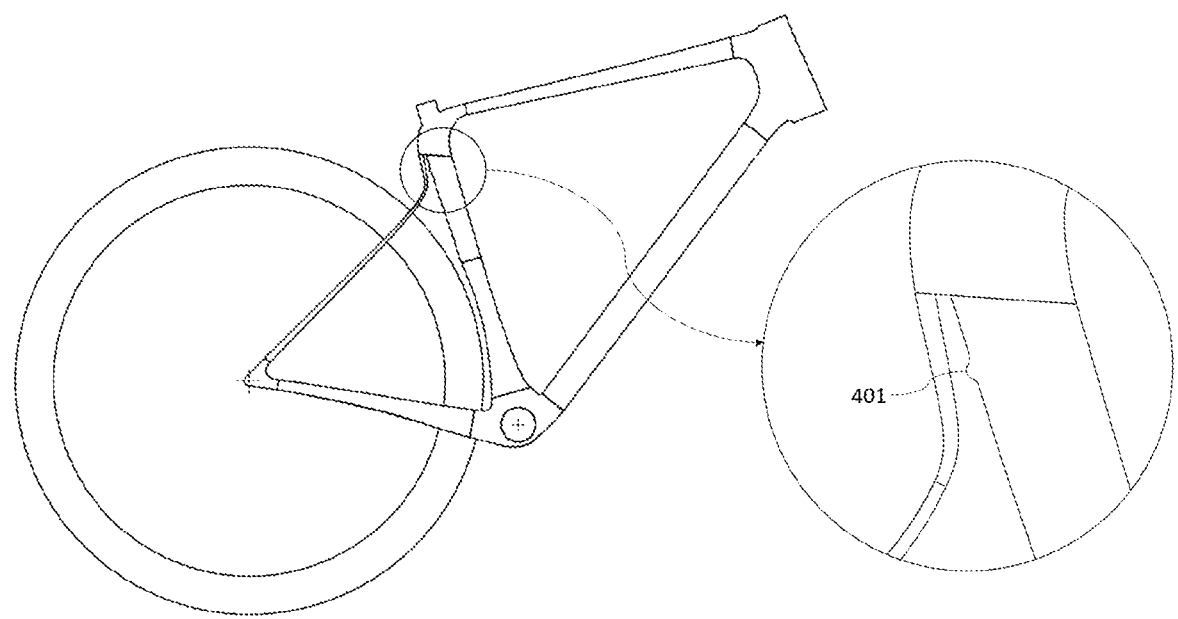

FIG. 4 shows an embodiment of said rear wheel suspension system, where said seat tube and said leaf spring are formed so that the effective spring length of said leaf spring is shortened as the said rear wheel suspension system compresses, by said leaf spring coming into contact with said seat tube at designated one or more locations 401, direct contact or indirect contact through intermediate bodies such as elastomer materials.

Thus, making for a progressive spring rate suspension system, this being a benefit for riders who want extra sensitive suspension for smaller hits, while having stiffer suspension deeper into the suspension travel.

Figure 5:
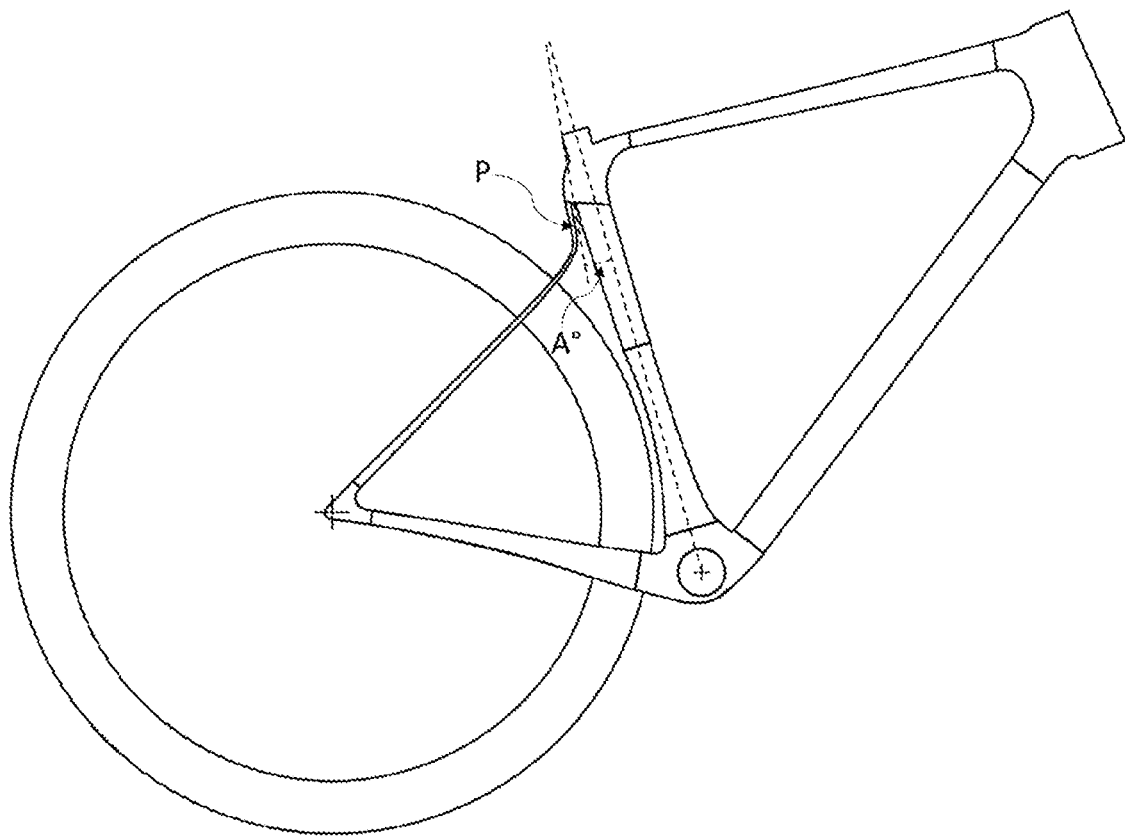

FIG. 5 shows an embodiment of said rear wheel suspension system, where more than 30% of the length of said top and bottom surfaces of said leaf spring leaf spring is at any given location less than 12° from being parallel to said seat tube of said bike, an angle for point P on said leaf spring shown as A° in figure.

Thus, enabling tight packaging of said leaf spring along said seat tube while providing flex in the desired direction, perpendicularly towards said seat tube, to effectively achieve upwards flex of said flexible chainstays.

In one embodiment of said rear wheel suspension system, more than 50% of the length of said top and bottom surfaces of said leaf spring is at any given location less than 12° from being parallel to said seat tube of said bike.

Thus, enabling tight packaging of said leaf spring along said seat tube while providing flex in the desired direction, perpendicularly towards said seat tube, to effectively achieve upwards flex of said flexible chainstays.

Figure 6:
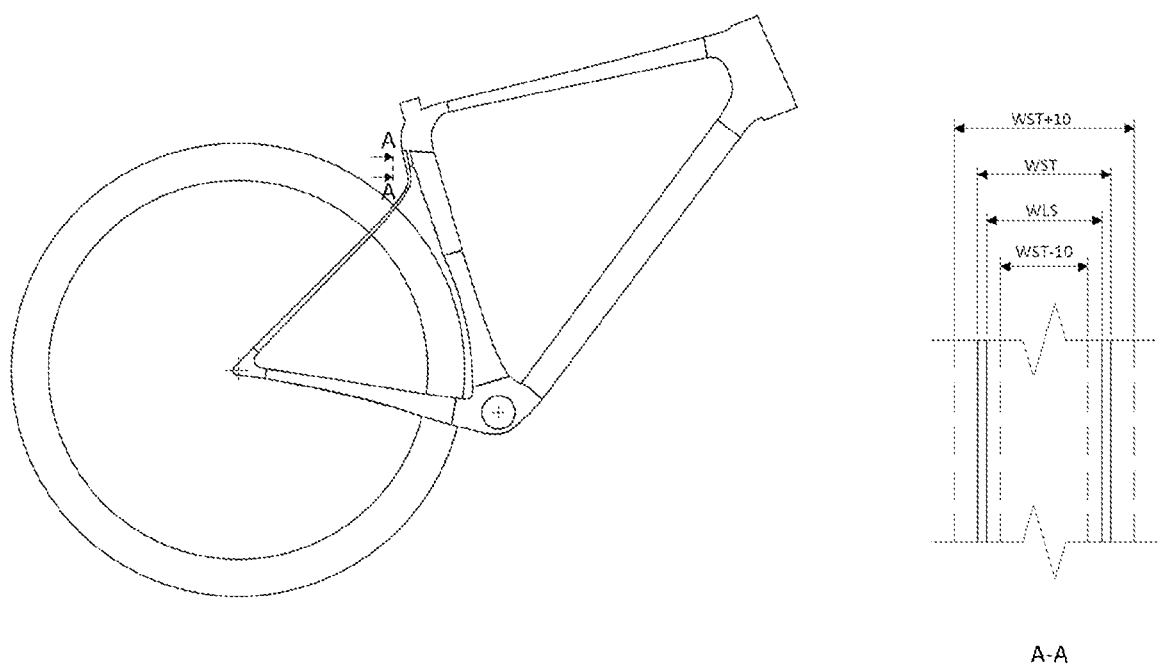

FIG. 6 shows an embodiment of said rear wheel suspension system, where the width of said leaf spring WLS at any given height above ground location is, when looked at from behind, within 10 mm of the width of said seat tube WST in the same height above ground location, for clarity said rotably attached rear wheel and said seatstays are not shown on this figure, dotted lines showing the +10 mm and −10 mm widths from said seat tube.

Thus, achieving good flexural performance, i.e. being able to carry high weight over a large displacement at a good stiffness in the intended flex direction, and good lateral stiffness of said leaf spring with limited obtrusiveness and limited added air resistance.

In one embodiment of said rear wheel suspension system, said rear wheel suspension system further comprises one or more stiffness adjustment inserts, arranged and secured in place between said leaf spring and said seat tube, said one or more stiffness adjustment inserts being secured in place by any applicable fastening methods.

Thus, enabling riders of different body weight and/or with different riding preferences to shorten the effective spring length of said leaf spring and thus increasing the spring rate of said rear wheel suspension system.

Figure 7:
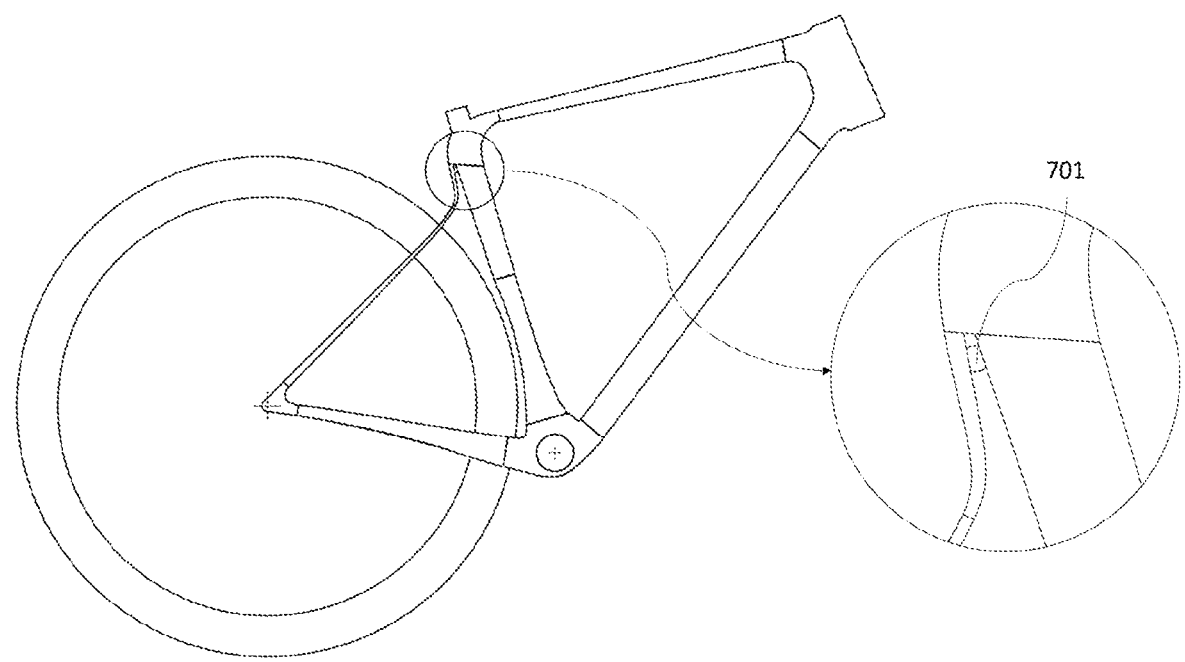
FIGS. 7-8 show different embodiments of the present invention comprising stiffness adjustment inserts.

FIG. 7 shows an embodiment of said rear wheel suspension system, where one or more of said one or more stiffness adjustment inserts 701 are each contacting both said leaf spring and said seat tube when rider is stationary in riding position on said bike.

Thus, changing the initial stiffness of the said rear wheel suspension system.

Figure 8:
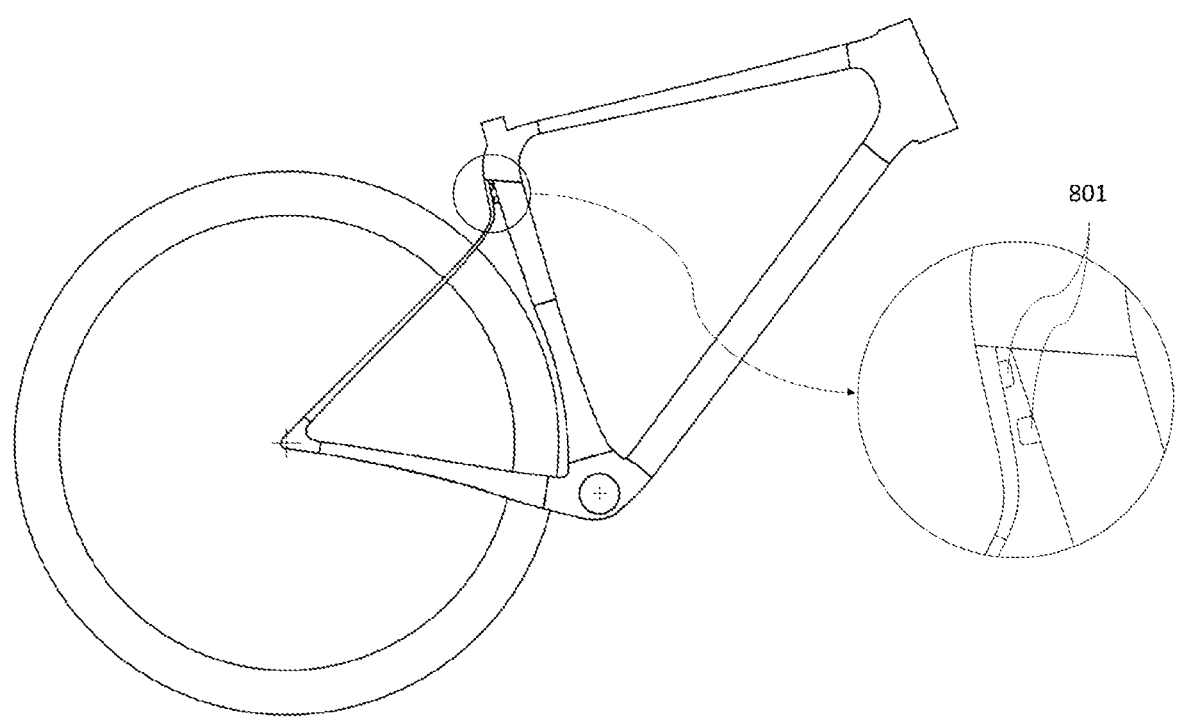

FIG. 8 shows an embodiment of said rear wheel suspension system, where one or more of said one or more stiffness adjustment inserts 801 are each contacting only either said leaf spring or said seat tube when rider is stationary in riding position on said bike, then each contacting both said leaf spring and said seat tube when further compressed into its suspension travel.

Thus, when only partially reaching between said seat tube and said leaf spring said one or more stiffness adjustment inserts can make for a progressive spring rate suspension system, as the said one or more inserts can come into contact with both sides when the suspension system has partially compressed and thereby decreasing the effective spring length, this is a benefit for riders who want extra sensitive suspension for smaller hits, while having stiffer suspension deeper into the suspension travel.

Figure 9:
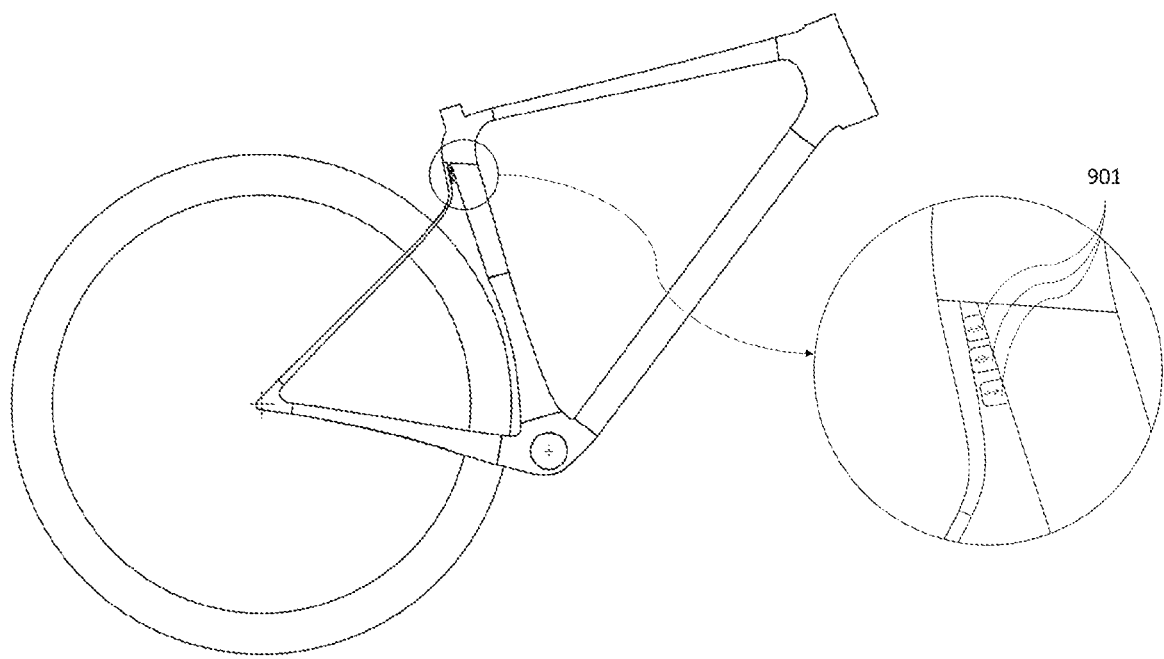
FIGS. 9-10 show different embodiments of the present invention comprising elevatable stiffness adjustment inserts.

FIG. 9 shows an embodiment of said rear wheel suspension system, where one or more of said one or more stiffness adjustment inserts 901 are elevatable substantially perpendicularly to said top and bottom surfaces of said leaf spring; secured to said seat tube and adjustable in how far they are elevated towards said leaf spring, said one or more stiffness adjustment inserts being secured in place by any applicable fastening method.

Thus, when fully reaching the opposite side, with a rider stationary in riding position on said bike, shortening the effective spring length of said leaf spring and thus stiffening the suspension, making it suit riders preferring stiffer suspension, when partially reaching the opposite side the said elevatable stiffness adjustment insert can make for a progressive spring rate suspension system, as the said elevatable stiffness adjustment insert comes into contact with the opposite side when the suspension system has partially compressed, this is a benefit for riders who want extra sensitive suspension for smaller hits, while having stiffer suspension deeper into the suspension travel.

Figure 10:
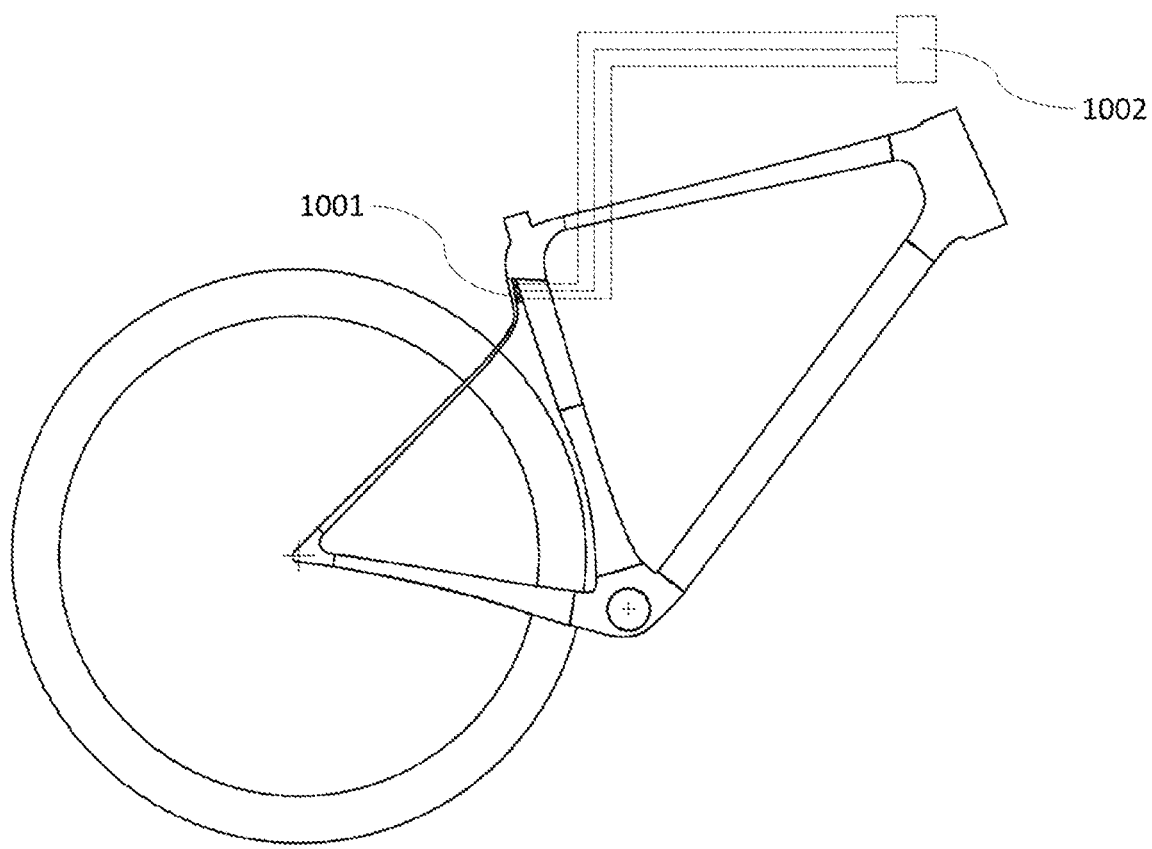

FIG. 10 shows an embodiment of said rear wheel suspension system comprising said one or more elevatable stiffness adjustment inserts, where one or more of said one or more elevatable stiffness adjustment inserts 1001 can be elevated by actuators such as, but not limited to, hydraulic pistons, screw jacks, etc. Said actuators can, e.g. but not limited to, be manually operated via buttons, levers, turn knobs, dials or with a tool such as an allen key or screwdriver. Operation of said actuators can be via a cable- or hydraulically connected remote, furthermore, said actuators can e.g. be driven by electric motors, either controlled via an electrical wire connected remote or via a wireless remote 1002. Said cable-, hydraulic-, electrical wire- or electrical wireless-remotes can for instance be mounted on the handlebar of said bike.

In one embodiment of said rear wheel suspension system, said top and bottom surfaces of said leaf spring are substantially parallel to the adjacent surface of said seat tube on the lengthwise portion of said leaf spring that reaches from where said leaf spring and seat tube connect, at the root of said leaf spring, to a portion at least 30% downwards along the length of said leaf spring.

Figure 11:
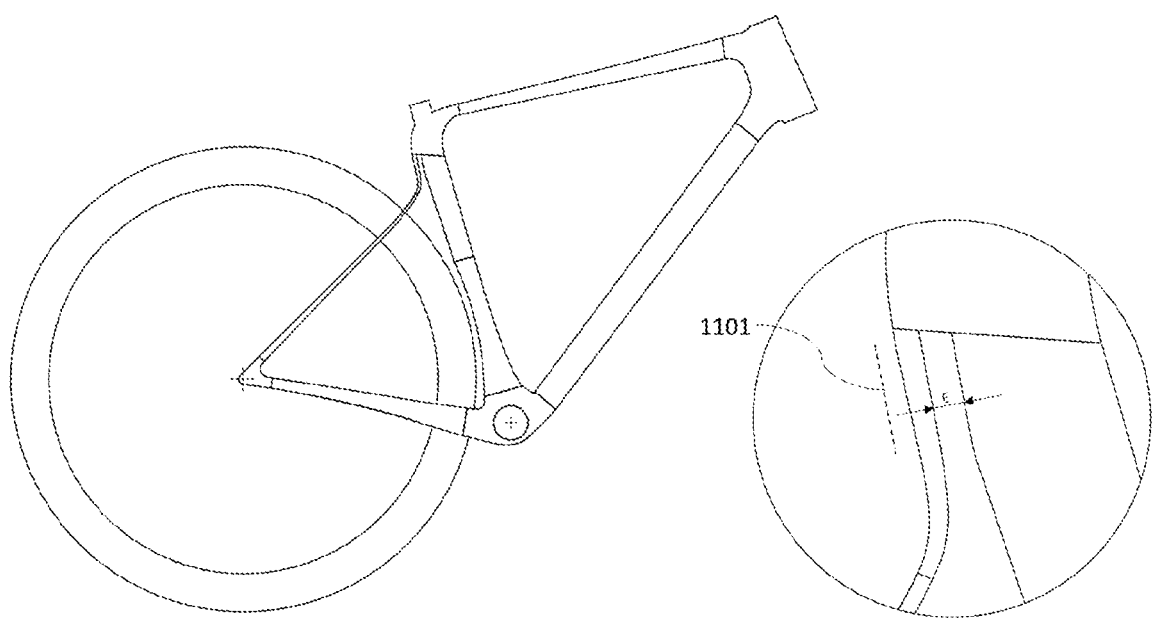
FIGS. 11-26 show different embodiments of the present invention comprising, or configured to comprise, slidable stiffness adjustment inserts.

FIG. 11 shows an embodiment of said rear wheel suspension system, said top and bottom surfaces of said leaf spring are substantially parallel to the adjacent surface of said seat tube on the lengthwise portion of said leaf spring that reaches from where said leaf spring and seat tube connect, at the root of said leaf spring, to a portion at least 30% downwards along the length of said leaf spring, in this said substantially parallel lengthwise portion 1101 of said top and bottom surfaces of said leaf spring the substantially perpendicular distance E between said leaf spring and said seat tube being between 1 mm and 40 mm, such as 5-20 mm.

Thus, creating "real estate" for slidable stiffness adjustment inserts between said leaf spring and said seat tube. Said slidable stiffness adjustment inserts able to slide upwards and downwards along said leaf spring and seat tube to tune the stiffness of said rear wheel suspension system.

In one embodiment of said rear wheel suspension system, where said top and bottom surfaces of said leaf spring are substantially parallel to the adjacent surface of said seat tube on the lengthwise portion of said leaf spring that reaches from where said leaf spring and seat tube connect, at the root of said leaf spring, to a portion at least 30% downwards along the length of said leaf spring, said leaf spring is substantially straight in said at least 30% upwards along the length of said leaf spring.

Thus, allowing for straight linear actuators to be used, that would not be able to function along significantly curved leaf springs, such as screw jack actuators.

Figure 12:
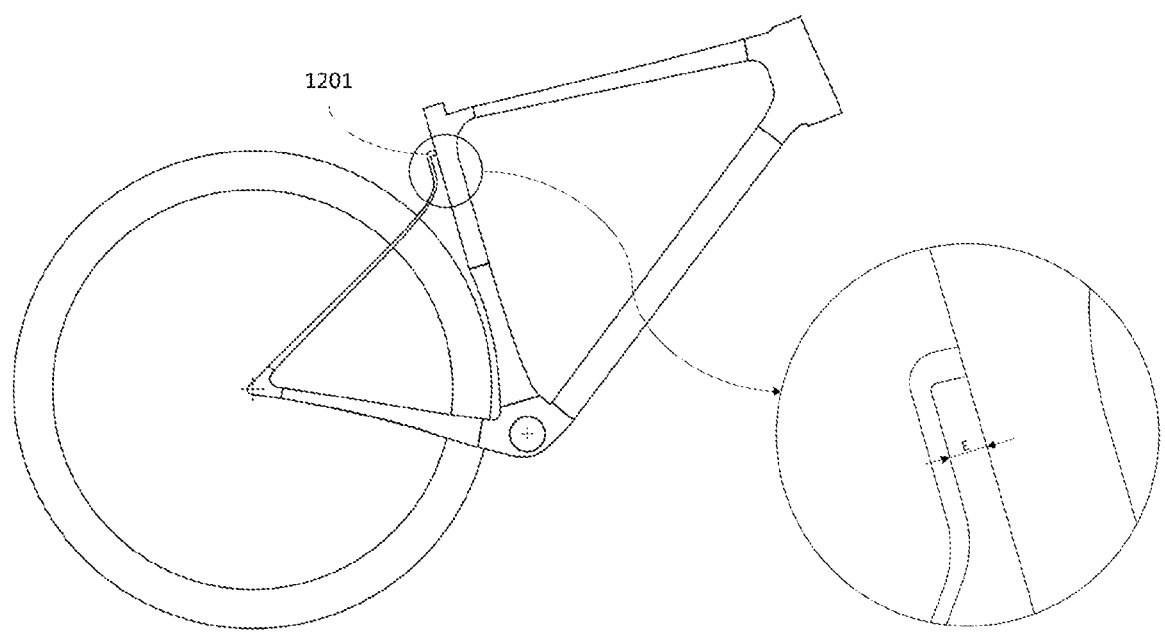

FIG. 12 shows an embodiment of said rear wheel suspension system, where said perpendicular distance E is achieved through a kink 1201 in the shape of said leaf spring at its root, above said portion of said leaf spring where it is substantially parallel to the adjacent surface of said seat tube.

Figure 13:
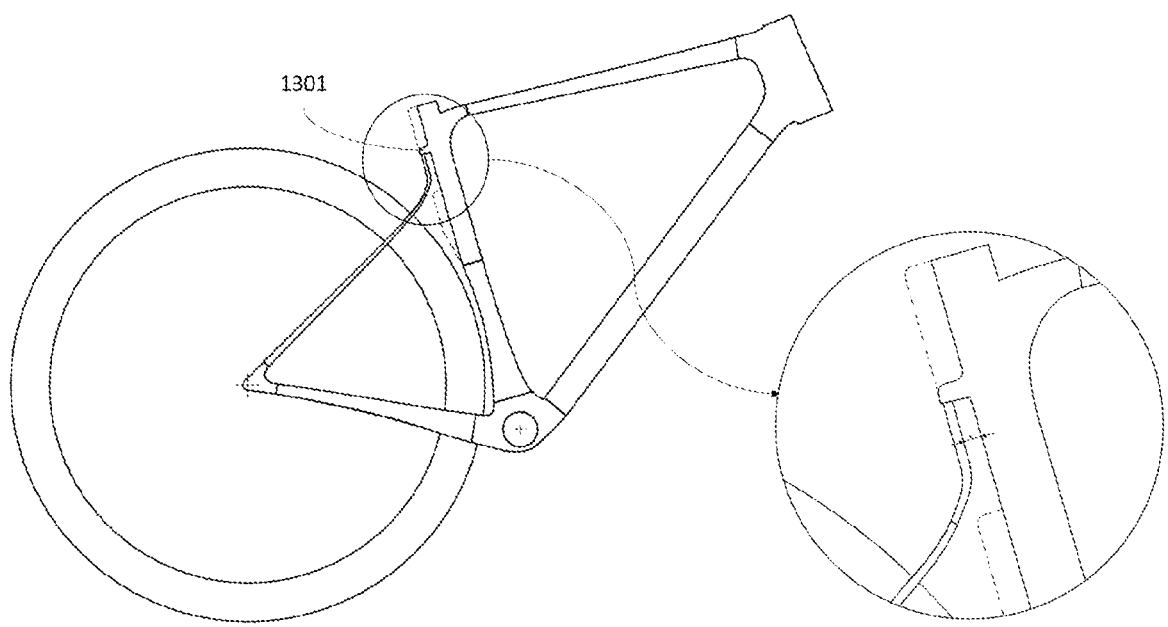

FIG. 13 shows an embodiment of said rear wheel suspension system, where said perpendicular distance E is achieved through said leaf spring connecting to the posterior part of a posteriorly elevated portion 1301 of the seat tube, elevated perpendicularly from said seat tube as it is in the said substantially parallel lengthwise portion of said leaf spring. Dotted lines in the figure show examples of how said seat tube can further be elevated posteriorly in areas outside of the substantially parallel lengthwise portion of said leaf spring.

Whether said perpendicular distance E is e.g. achieved through said kink in the shape of said leaf spring, via a said posteriorly elevated portion of the seat tube, a combination of the two, or any other comparable methods, said body achieving said perpendicular distance E is defined as a part of said root of said leaf spring.

Figure 14:
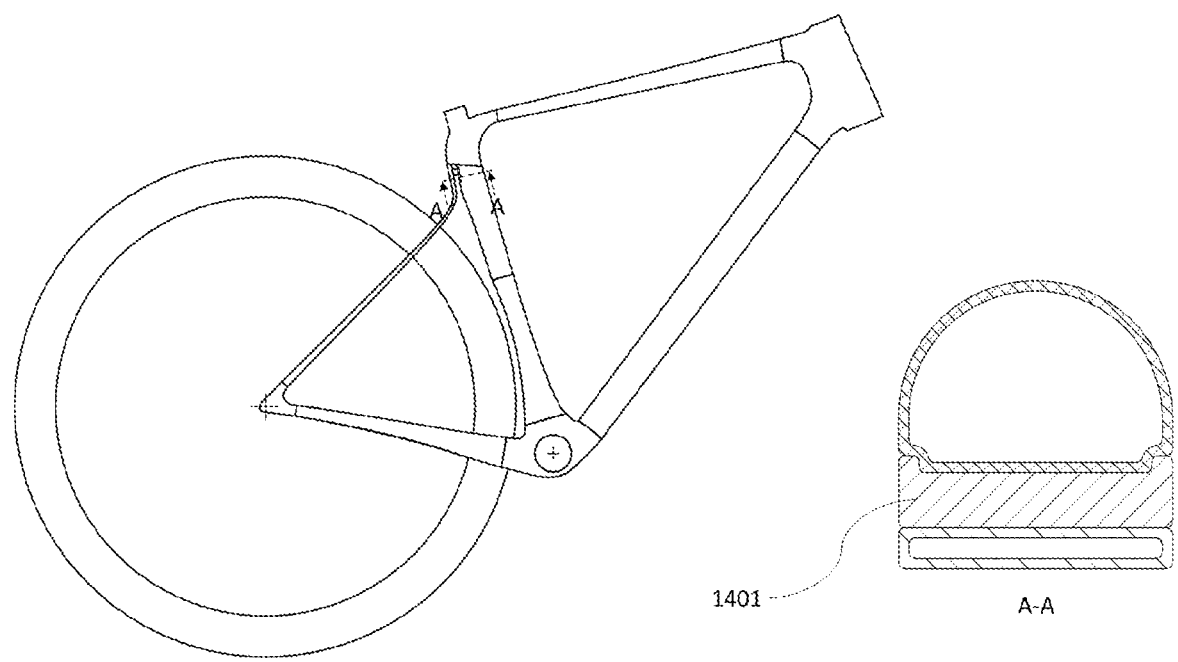

FIG. 14 shows an embodiment of said rear wheel suspension system, where one or more of said one or more stiffness adjustment inserts are slidable upwards and downwards along and between said leaf spring and said seat tube, said one or more slidable stiffness adjustment inserts 1401 being guided to prevent lateral movement, when rider is stationary in riding position on said bike said one or more slidable stiffness adjustment inserts can either reach entirely between said leaf spring and said seat tube, or reach partially between said leaf spring and said seat tube.

Thus, when reaching entirely between the said leaf spring and seat tube shortening the effective spring length of said leaf spring and thus stiffening the suspension, when partially reaching between the said leaf spring and seat tube the said one or more slidable stiffness adjustment inserts can make for a progressive spring rate suspension system, as the said insert achieves contacts with both said leaf spring and said seat post when the suspension system has partially compressed, this is a benefit for riders who want extra sensitive suspension for smaller hits, while having stiffer suspension deeper into the suspension travel. Being slidable upwards/downwards can enable a rider to conveniently adjust his suspension according to his preference.

In one embodiment of said rear wheel suspension system comprising said one or more slidable stiffness adjustment inserts, said one or more slidable stiffness adjustment inserts are between 5-40 mm long, i.e. in the upwards/downwards direction.

Figure 15:
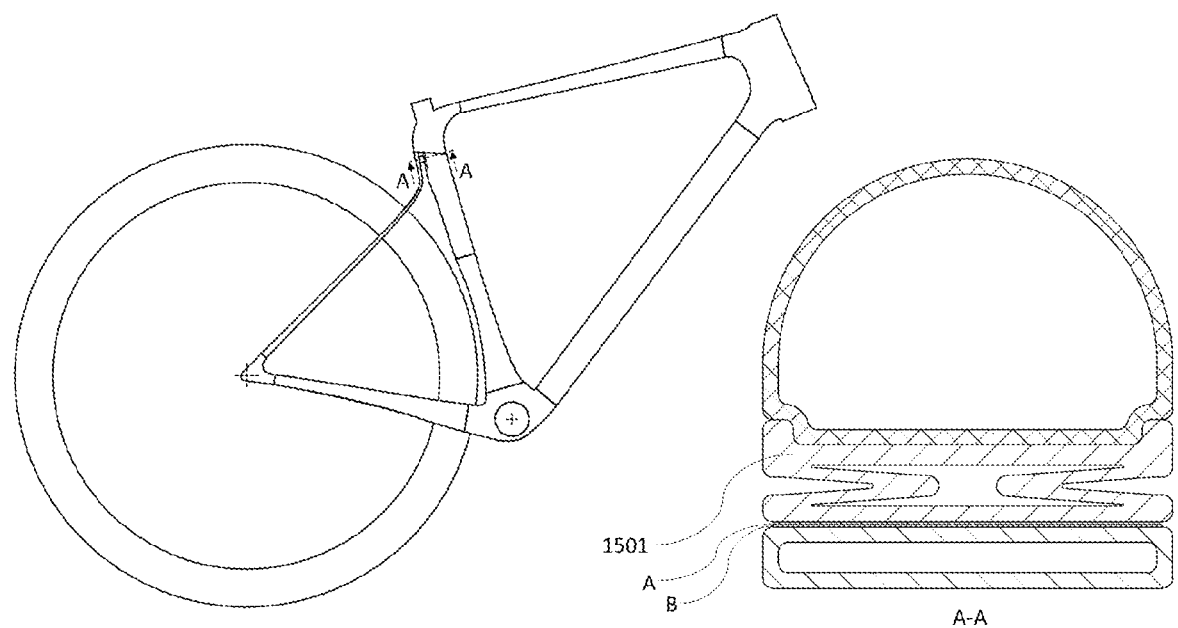

FIG. 15 shows an embodiment of said rear wheel suspension system, comprising one or more slidable stiffness adjustment inserts, where one or more of said one or more slidable stiffness adjustment inserts 1501 comprise a mechanically gripping texture A that interacts with a matching opposing mechanically gripping texture B on said leaf spring (this interaction could just as well take place on said seat tube), said one or more mechanically gripping slidable stiffness adjustment inserts further comprising means of pressuring said opposing mechanically gripping textures A and B together, said pressuring may be done via, but not limited to, spring loading, screw tightening, etc.

Thus, preventing said one or more mechanically gripping slidable stiffness adjustment inserts from slipping unintentionally upwards or downwards along said leaf spring and seat tube during riding of said bike.

Figure 16:
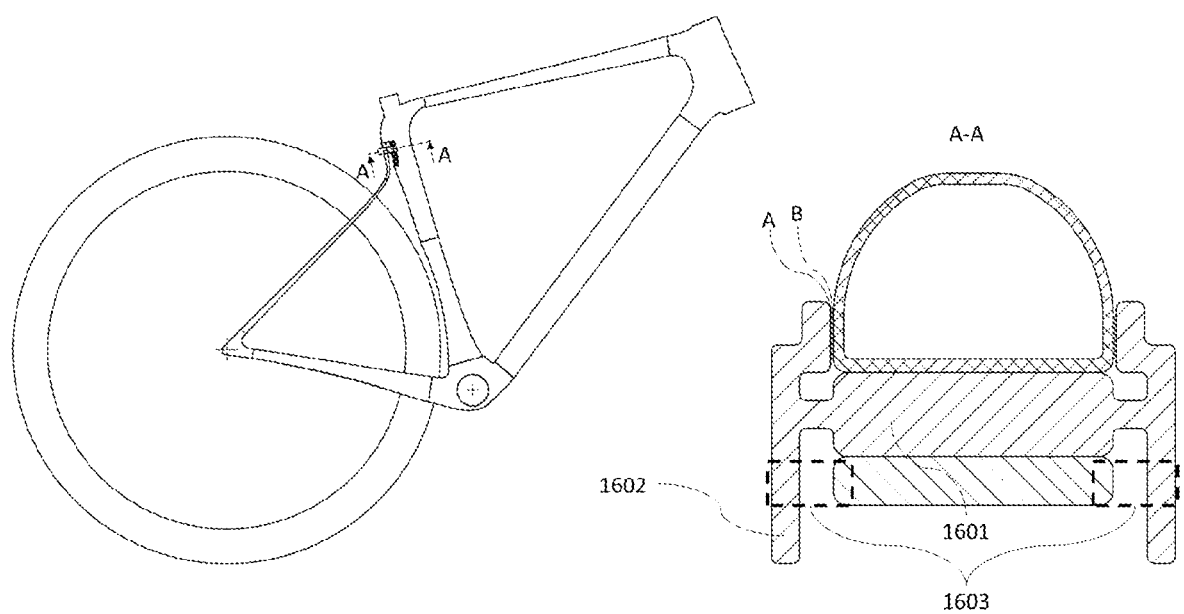

FIG. 16 shows an embodiment of said rear wheel suspension system, where said mechanically gripping textures A and B are located laterally on said seat tube (could equally be located laterally on said leaf spring for same effect) where said pressuring of said opposing mechanically gripping textures A and B together is achieved through a spring-loaded lever 1602, where pushing said lever levitates said pressure and thus allows said slidable stiffness adjustment insert 1601 to be slid upwards or downwards while lever is pushed or pulled. Similar designs could reach same effect when said lever is puller rather than pushed, in the pictured embodiment this would be achieved by moving mechanically gripping textures to locations within dotted boxes 1603, making said mechanically gripping textures A and B located on same "side" as said lever.

In one embodiment of said rear wheel suspension system comprising one or more slidable stiffness adjustment inserts, said rear wheel suspension system further comprising a linear actuator for sliding one or more of said one or more slidable stiffness adjustment inserts upwardly and downwardly. Said linear actuator can e.g. be a screw jack, scissor drive, rack and pinion drive, hydraulic actuator, pneumatic actuator, pullable wire plus retracting spring combo, etc.

Figure 17:
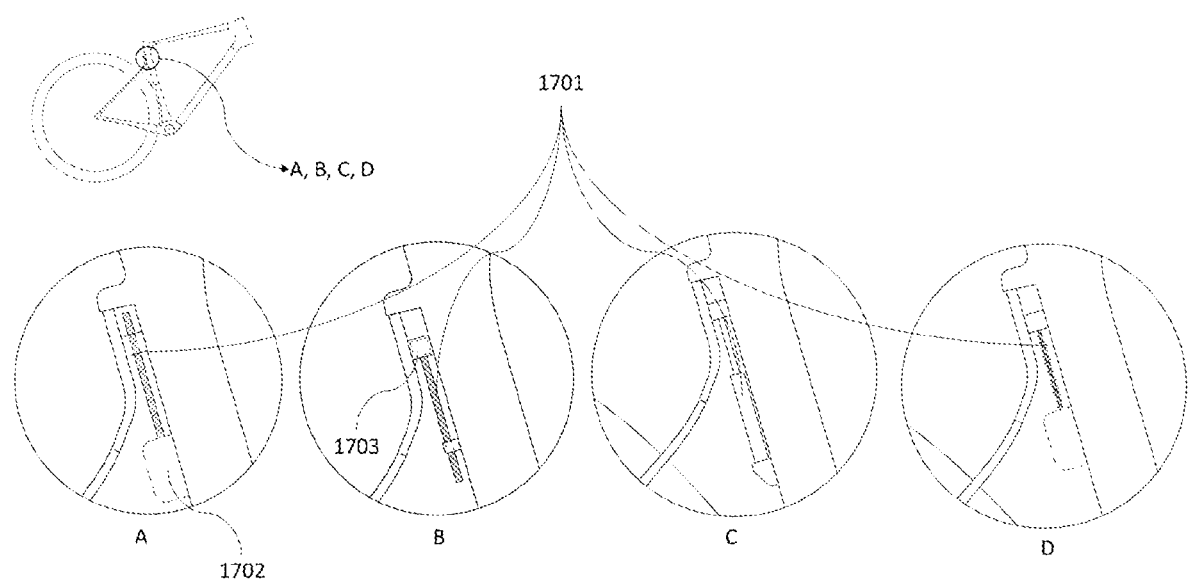

FIG. 17 shows an embodiment of said rear wheel suspension system comprising said linear actuator 1701, shown in configurations A, B, C, D, where said linear actuator (A=screw jack with driving mechanism 1702, B=screw jack with driving mechanism 1703, C=pneumatic or hydraulic actuator, D=pullable wire plus retracting spring combo) extends downwards from said one or more of said one or more slidable stiffness adjustment inserts and then connects its other end, directly or via an intermediate body, to the remainder of said bike, e.g. said leaf spring, said seat tube or said root of said leaf spring.

In one embodiment of said rear wheel suspension system comprising said linear actuator, said linear actuator is arranged in a groove that runs up and down the posterior surface of said seat tube (with the notable exclusion of a scissor drive linear actuator, as it would not easily fit in a groove).

Thus, moving said linear actuator out of the way from a flexing leaf spring, allowing more flex of said leaf spring than otherwise possible.

Figure 18:
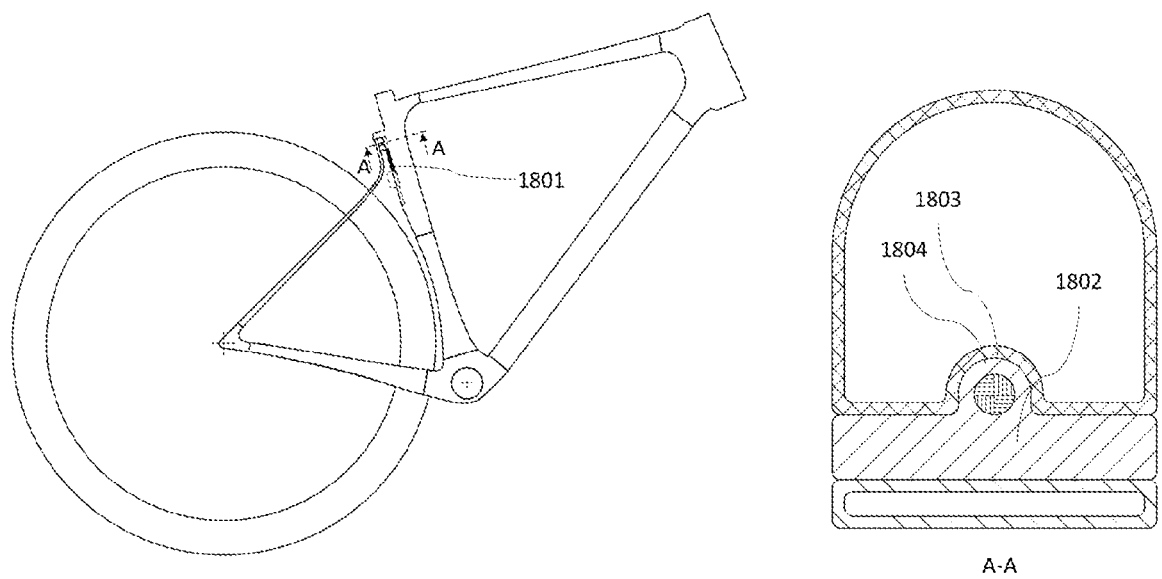

FIG. 18 shows an embodiment of said rear wheel suspension system comprising said linear actuator 1801, with slidable stiffness adjustment insert 1802, where said linear actuator is arranged in a groove 1803 that runs up and down the posterior surface of said seat tube (with the notable exclusion of a scissor drive linear actuator, as it would not easily fit in a groove) said one or more of said one or more slidable stiffness adjustment inserts have an extrusion 1804 shaped to interact laterally with the surface of said groove.

Thus, simultaneously moving said linear actuator out of the way from a flexing leaf spring, allowing more flex than otherwise possible, and preventing lateral movement of said one or more slidable inserts.

Figure 19:
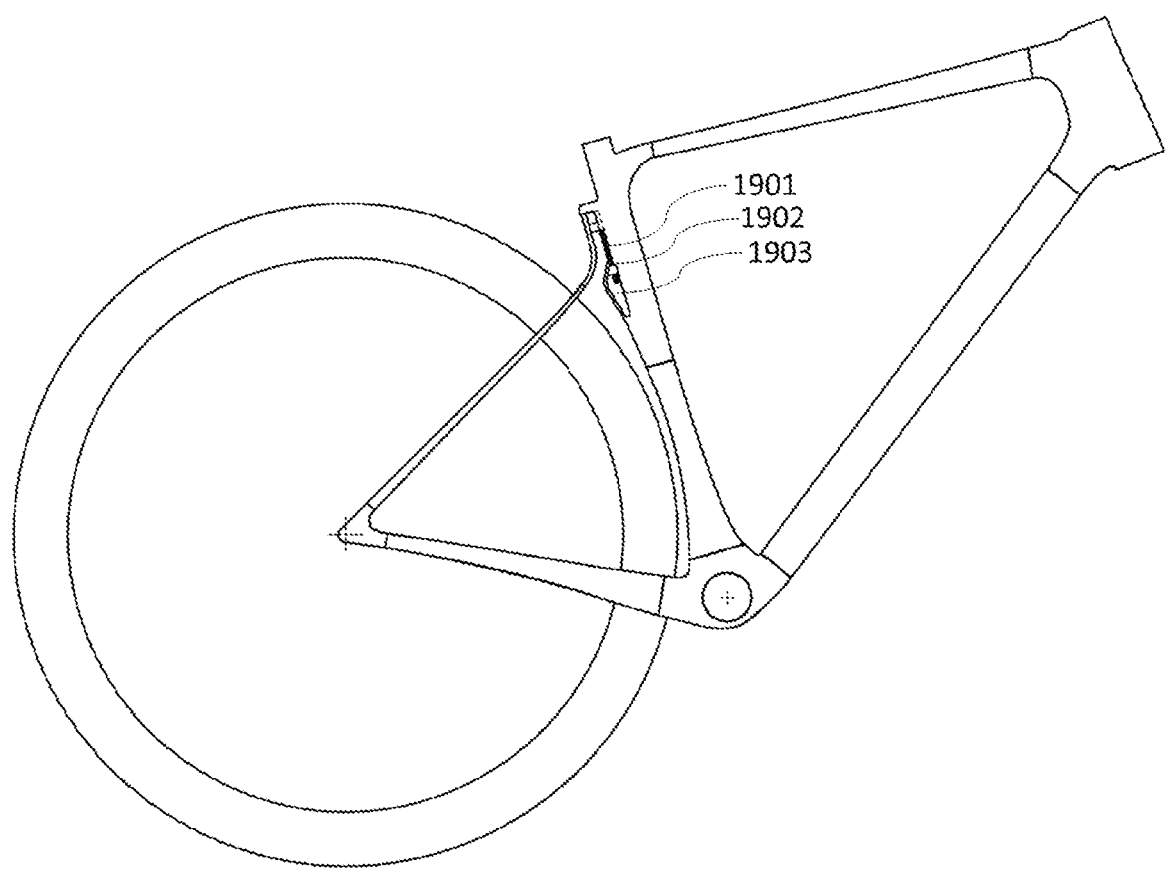

FIG. 19 shows an embodiment of said rear wheel suspension system comprising said linear actuator 1901, where said linear actuator extends downwards from said one or more of said one or more slidable stiffness adjustment inserts and then extending further through an opening 1902 on the posterior surface of said seat tube, into a cavity 1903 in said seat tube.

Thus, allowing space-demanding mechanical parts of said linear actuator to be placed in said seat tube, thereby not intruding into the valuable flex zone of said leaf spring or the valuable space required for the rear wheel of said bike.

Figure 20:
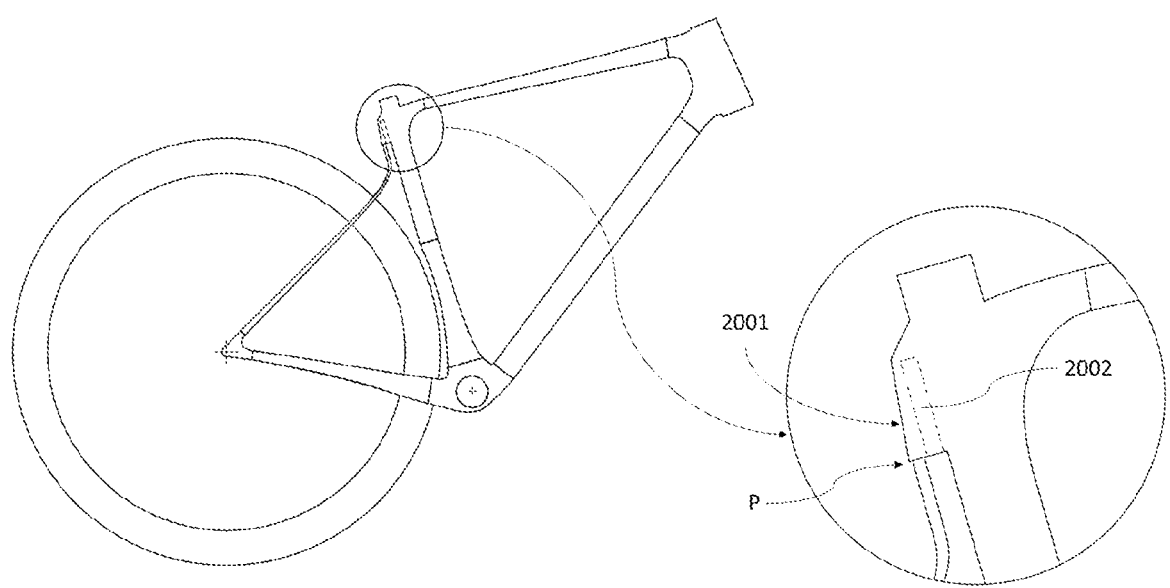

FIG. 20 shows an embodiment of said rear wheel suspension system, comprising said root of said leaf spring 2001, where said root of said leaf spring has a hole 2002 up into it, that gives linear actuators that reach upwards from said one or more of said one or more slidable stiffness adjustment inserts access to added space above where said leaf spring at location P reaches said root of said leaf spring.

Thus, enabling said one or more of said one or more slidable inserts to slide closer to said root of said leaf spring than would otherwise be possible using said upwards reaching linear actuator, as said linear actuator can reach into said hole.

Figure 21:
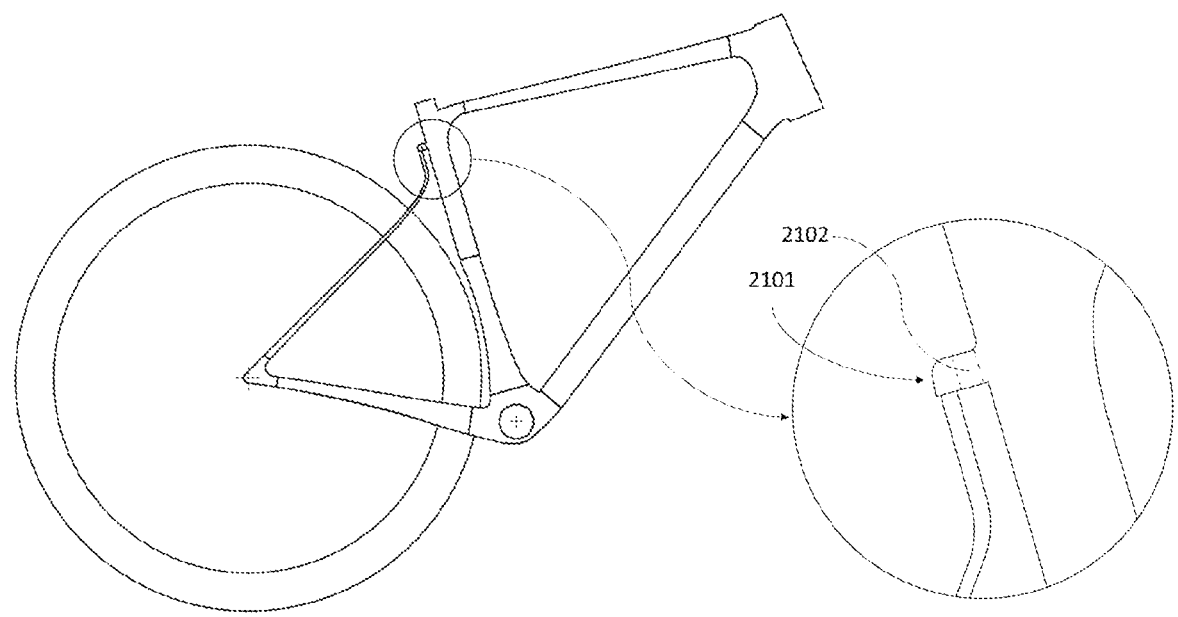

FIG. 21 shows an embodiment of said rear wheel suspension system, comprising said root of said leaf spring 2101, where said root of said leaf spring has a hole 2102 up through it, that gives linear actuators that reach upwards from said one or more of said one or more slidable stiffness adjustment inserts access to added space above where said leaf spring at location P reaches said root of said leaf spring.

Thus, enabling said one or more of said one or more slidable inserts to slide closer to said root of said leaf spring than would otherwise be possible using said upwards reaching linear actuator, as said linear actuator can reach through said hole. This configuration gives access to practically unlimited space, outside the envelope of the bike frame itself, for mechanism associated with said linear actuator. Furthermore, this configuration allows for easy tool access from above, such as when using an allen key or an electric motor to drive a screw jack.

Figure 22:
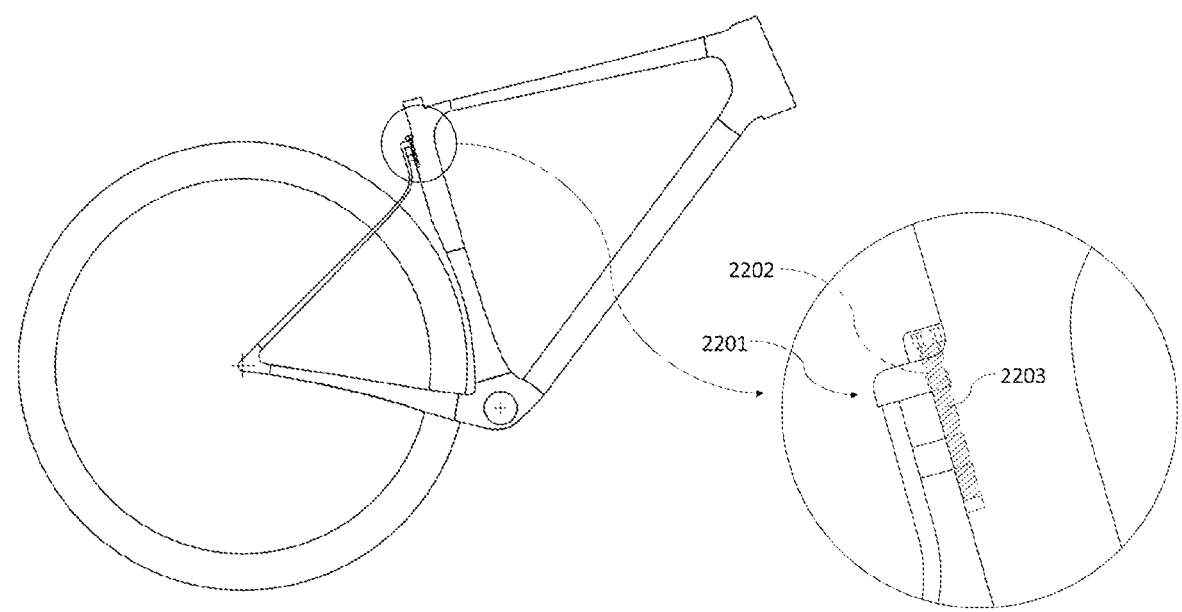

FIG. 22 shows an embodiment of said rear wheel suspension system, comprising said root of said leaf spring 2201, where said root of said leaf spring has a hole 2202 up through it, wherein said linear actuator 2203 is arranged in a groove that runs up and down the posterior surface of said seat tube, with said one or more of said one or more slidable stiffness adjustment inserts having an extrusion shaped to interact laterally with the surface of said groove, said linear actuator is in this embodiment a screw jack with the input torque applied from above through said hole through said root of said leaf spring, the linear actuator action taking place through threads in said slidable stiffness adjustment insert.

Figure 23:
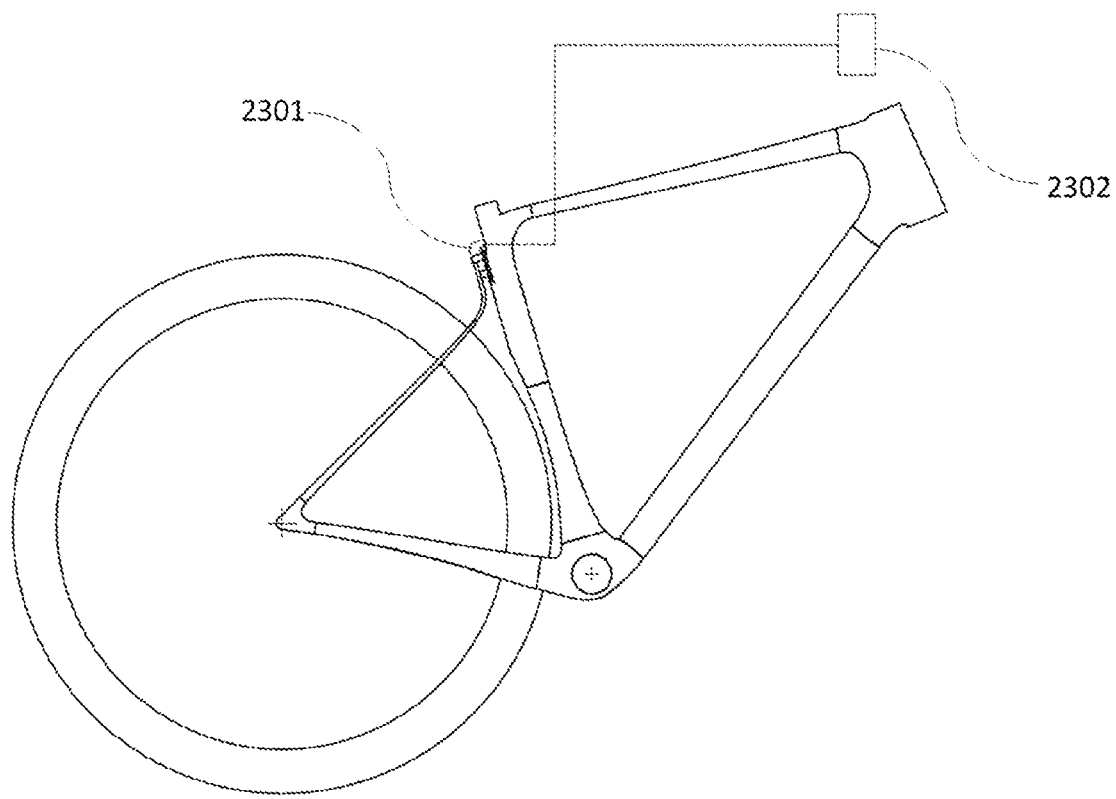

FIG. 23 shows an embodiment of said rear wheel suspension system, where said linear actuators 2301 can, e.g. but not limited to, be manually operated via buttons, levers, turn knobs, dials or with a tool such as an allen key or screwdriver. Operation of said actuators can be via a cable- or hydraulically connected remote 2302. Furthermore, said actuators can e.g. be driven by electric motors, either controlled via an electrical wire connected remote or via a wireless remote. Said cable-, hydraulic-, electrical wire- or electrical wireless-remotes can for instance be mounted on the handlebar of said bike.

Figure 24:
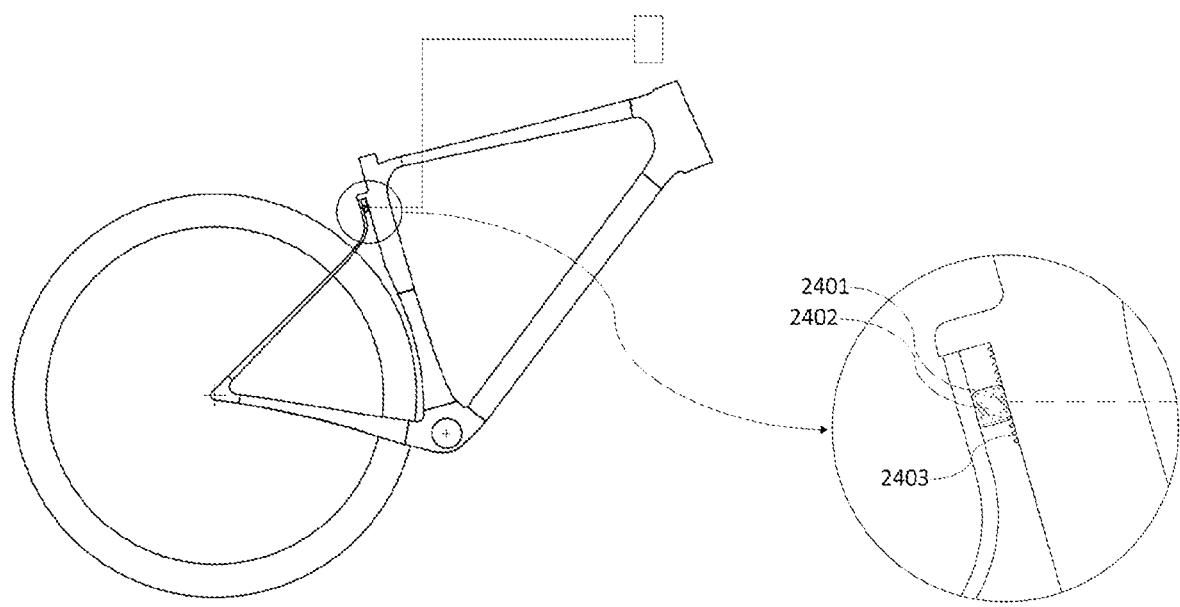

FIG. 24 shows an embodiment of said rear wheel suspension system, comprising said one or more slidable stiffness adjustment inserts 2401, where said linear actuator is a rack and pinion system that comprises a wheel or pinion 2402 mounted on one or more of said one or more slidable stiffness adjustment inserts that interacts with cogged or toothed racks/bars or rails 2403 that are fixed to said leaf spring and/or seat tube and extending upwards/downwards along said leaf spring and/or seat tube.

Thus, by turning said wheel or pinion driving said one or more slidable stiffness adjustment inserts upwards/downwards, said wheel or pinion moving upwards/downwards with said slidable stiffness adjustment insert, and thus altering the stiffness of said rear wheel suspension system by lengthening/shortening the effective spring length of said leaf spring.

Figure 25:
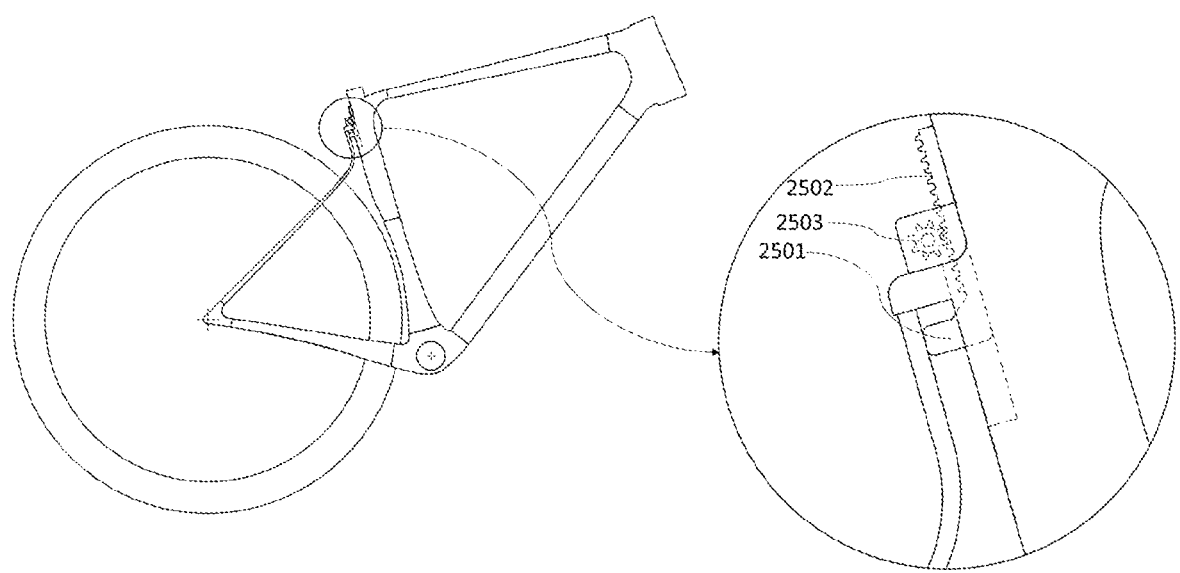

FIG. 25 shows an embodiment of said rear wheel suspension system, comprising said one or more slidable stiffness adjustment inserts 2501, said linear actuator is a rack and pinion system that comprises a wheel or pinion 2503 mounted to either said seat tube or said leaf spring, then interacting with cogged or toothed racks/bars or rails 2502 that are fixed to one or more of said one or more slidable inserts extending upwards/downwards along said leaf spring and/or seat tube.

Thus, by turning said wheel or pinion driving said one or more slidable stiffness adjustment inserts up/down, while said wheel or pinion does not move upwards/downwards itself relatively to said leaf spring and said seat tube, and thus altering the stiffness of said rear wheel suspension system by lengthening/shortening the effective spring length of said leaf spring.

Figure 26:
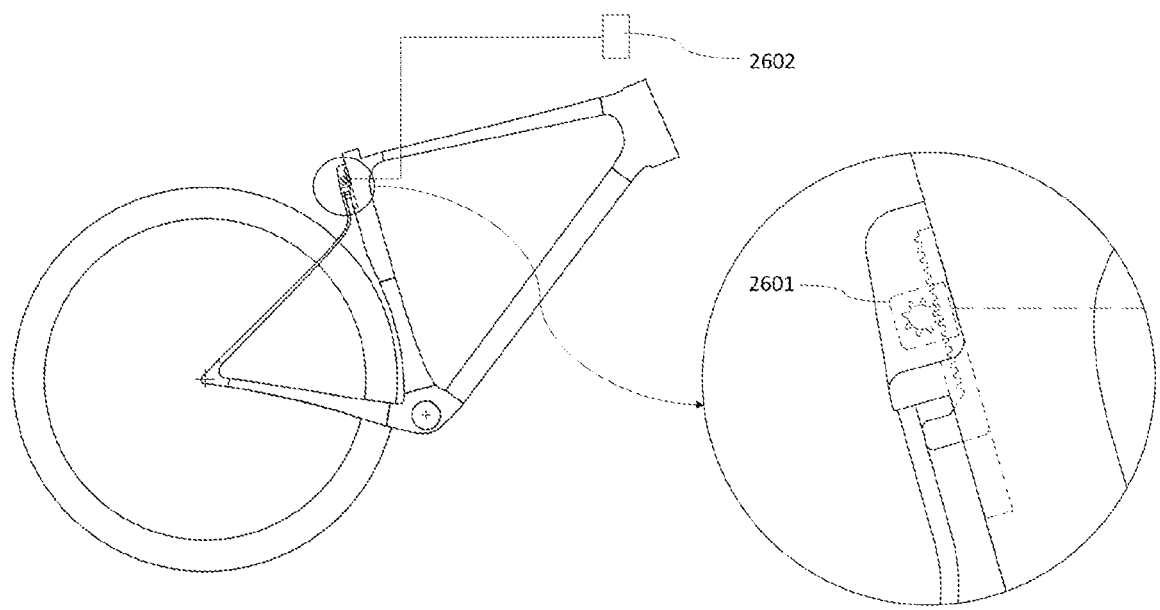

FIG. 26 shows an embodiment of said rear wheel suspension system, comprising said wheel or pinion and said one or more cogged or toothed racks/bars or rails, where said wheel or pinion is connected to a drive mechanism 2601 operated via, but not limited to, a button, a lever, a turn knob, a dial or via a tool such as an allen key or screwdriver, operation can e.g. be via a cable- or hydraulically connected remote 2602, or in the case when said drive mechanism is powered by one or more electric motors, either via electrical-wire connected remote or via wireless remote, said remotes, weather they are connected by a cable-, hydraulic line, electrical wire- or electrical wireless communications, can for instance be mounted on the handlebar of said bike.

Figure 27:
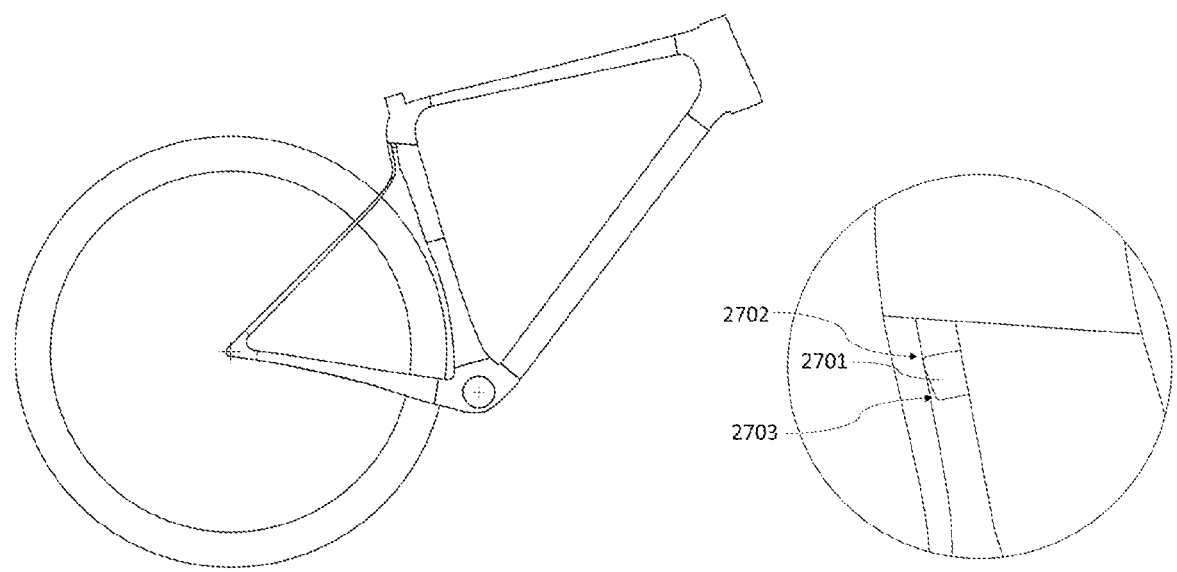
FIGS. 27-34 show further variations of the present invention.

FIG. 27 shows an embodiment of said rear wheel suspension system, comprising one or more stiffness adjustment inserts 2701, where one or more of said one or more stiffness adjustment inserts are formed so that the thickness of said one or more of said one or more stiffness adjustment inserts at the end 2702 that is closer to the root of said leaf spring is such that, when rider is stationary in riding position on said bike, it reaches entirely between said leaf spring and said seat tube, while its thickness at the end 2703 further away from the root of said leaf spring is such that it lacks up to 5 mm to reach entirely between said leaf spring and seat tube.

This can make each of said one or more of said one or more stiffness adjustment inserts provide more than one spring rate for said rear wheel suspension system, i.e. providing progressive stiffness. Stiffness ramping up as the end further away from the intersection of said leaf spring and seat tube comes in contact with both said leaf spring and seat tube, as the said suspension system has been partially compressed.

Figure 28:
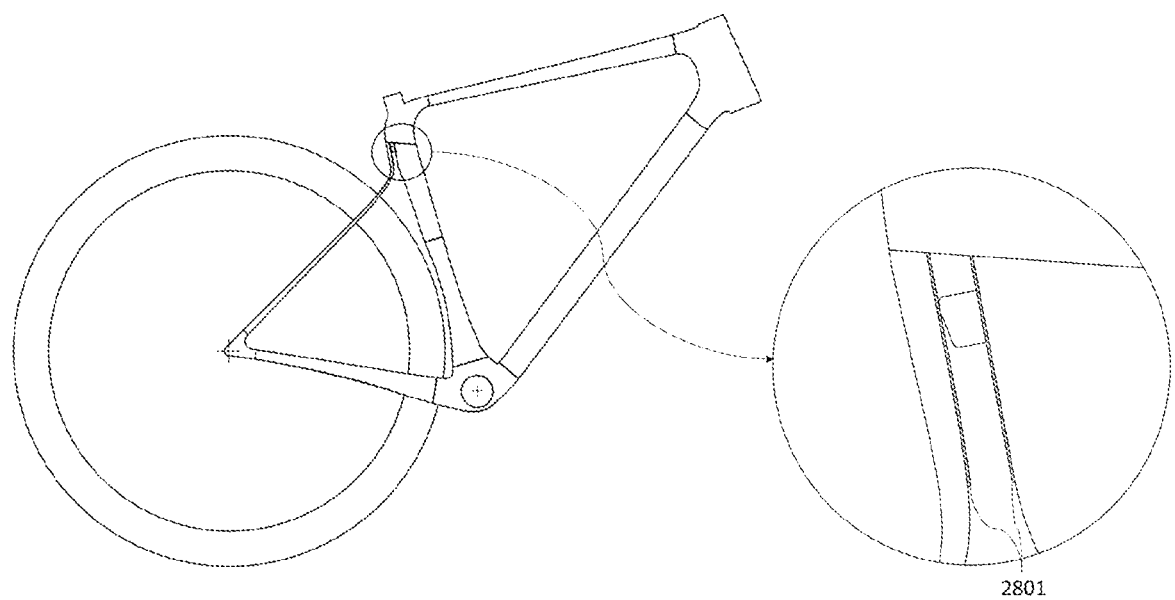

FIG. 28 shows an embodiment of said rear wheel suspension system comprising said one or more stiffness adjustment inserts, where said rear wheel suspension system further comprises a liner material 2801 fully or partially covering surfaces of said leaf spring and or said seat tube that otherwise could come into contact with each other and or into contact with one or more of said one or more stiffness adjustment inserts, said liner material can be made of, but is not limited to, titanium, steel, a plastic or elastomer material, said liner material is defined to become a part of the body it is attached to, whether it being said leaf spring or said seat tube.

Thus, protecting said leaf spring and/or said seat tube from friction and/or wear and potentially providing a smoother engagement of said one or more stiffness adjustment inserts.

Figure 29:
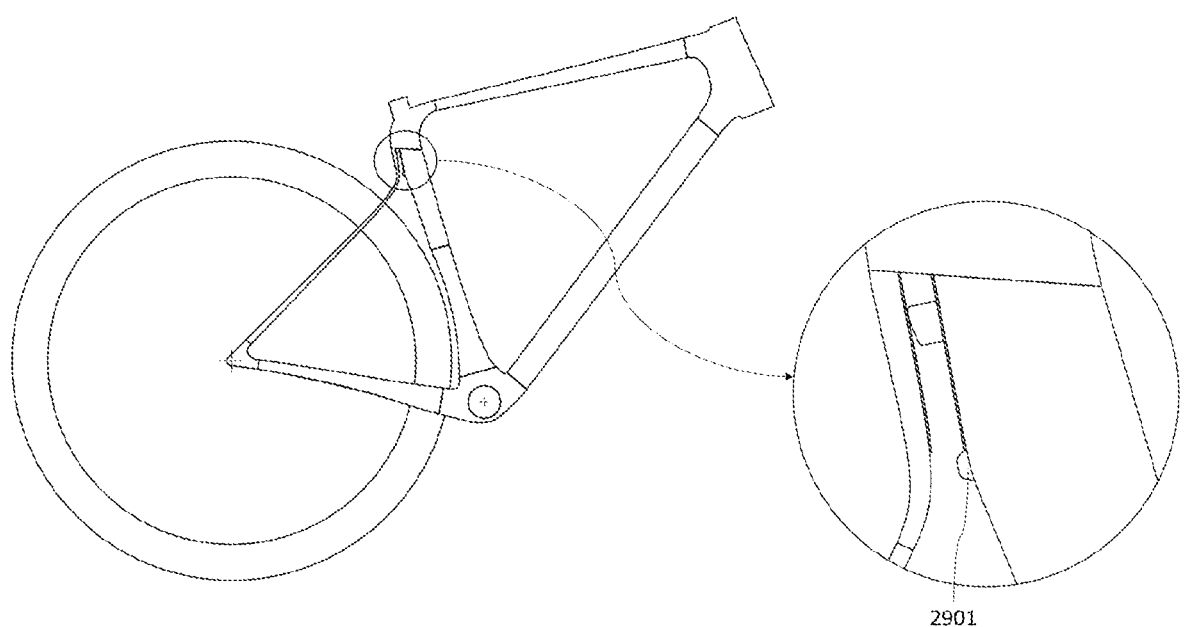

FIG. 29 shows an embodiment of said rear wheel suspension system, where an elastomer bump stop 2901 is located and secured in place between said leaf spring and said seat tube.

Thus, enabling a rear wheel suspension system design with a relatively low spring rate without it resulting in harsh bottom outs.

Figure 30:
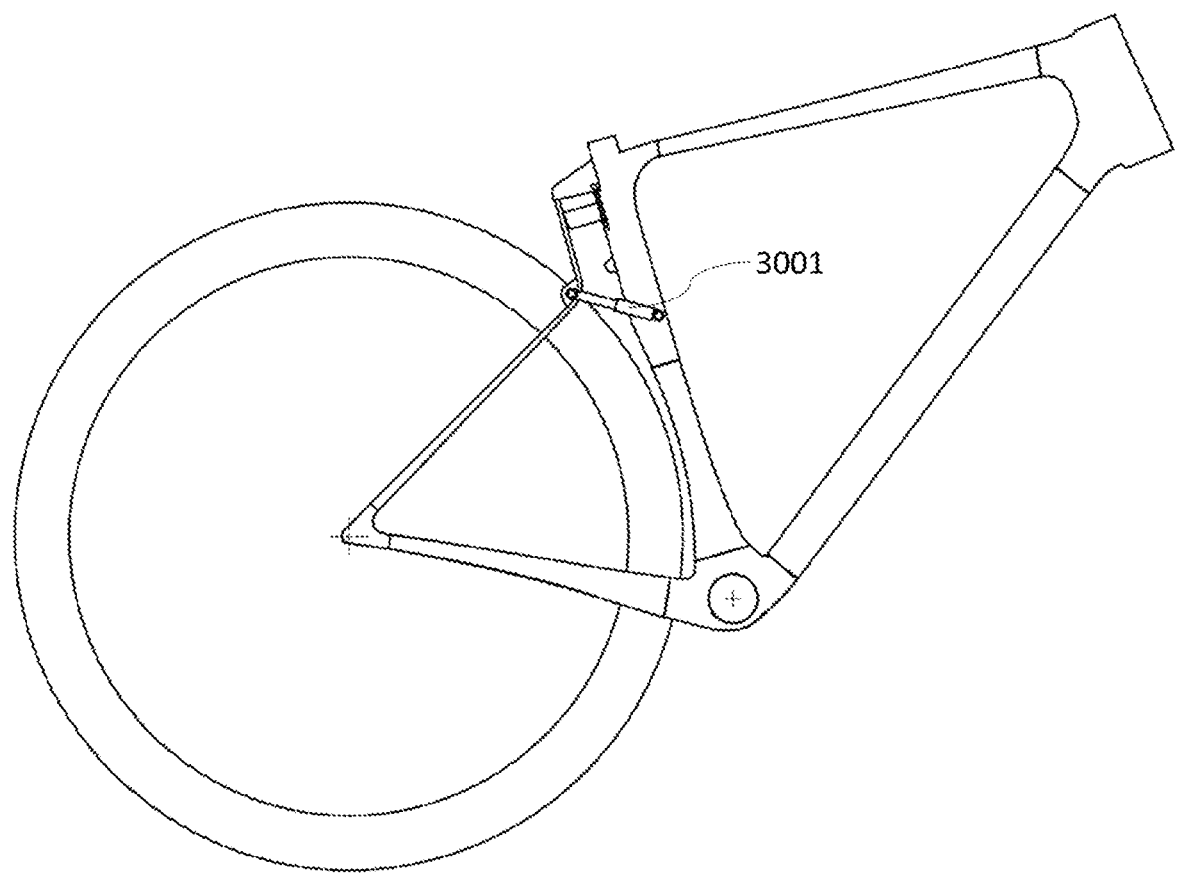

FIG. 30 shows an embodiment of said rear wheel suspension system, where said rear wheel suspension system further comprises a forwardly extending damper 3001 arranged from said seatstays or lower half of said leaf spring to said seat tube. Said damper can just as well be mounted to other locations on bike frame's front triangle, such as its top tube.

Thus, further control of the dynamics of the suspension is provided by means of absorbing compression and/or rebound energy, this becomes desirable when said rear wheel suspension system is used to achieve relatively long travel suspension. As a rough reference, this is often considered to happen when suspension travel reaches approximately 40-70 mm.

Figure 31:
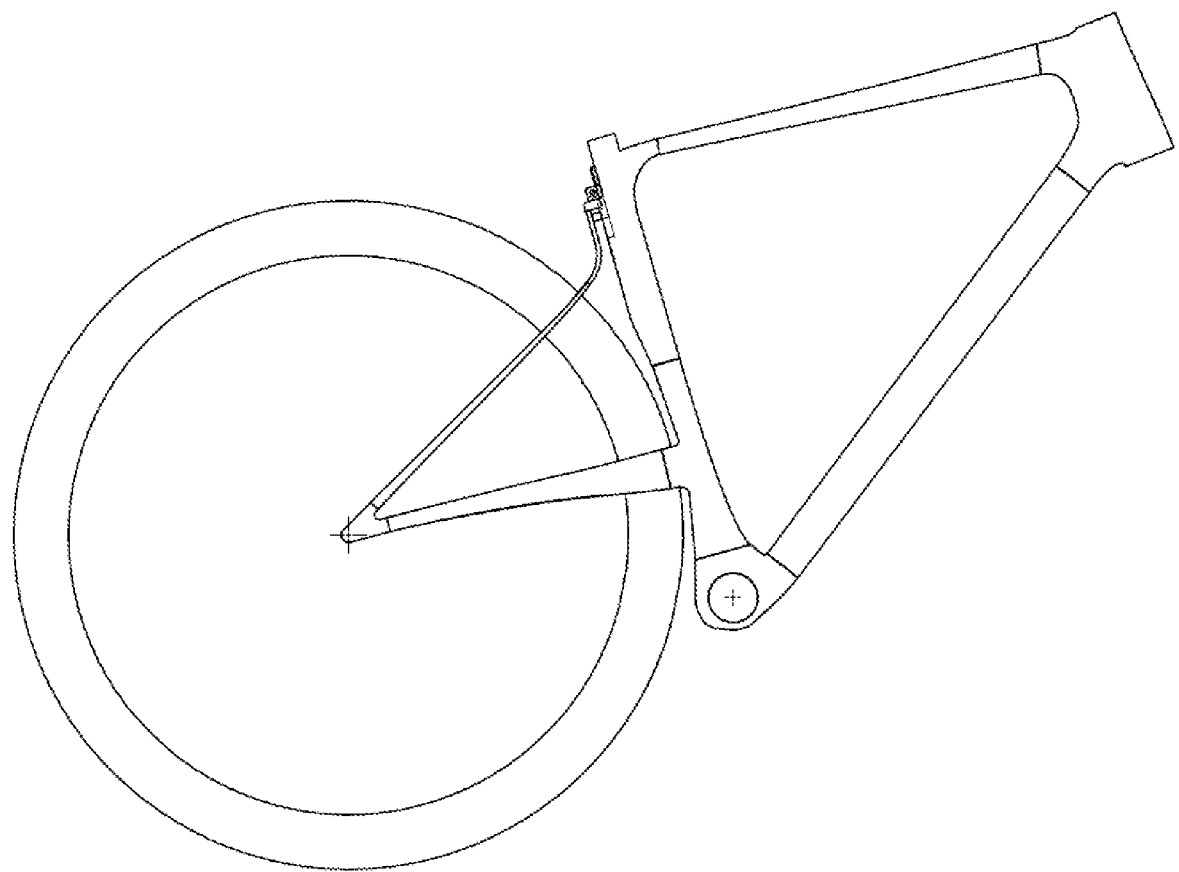

FIG. 31 shows an embodiment of said rear wheel suspension system, where said left side flexible chainstay and said right side flexible chainstay connect to said seat tube between 100 mm and 250 mm above the rotational axis of the bottom bracket area of said bike, both said left side flexible chainstay and said right side flexible chainstay connecting to said seat tube at substantially the same height.

Thus, potentially freeing up space to fit wider tires on said bike without said tires interfering with crankset of said bike, and furthermore changing the movement path of the suspended said rear wheel so that the movement is more directed rearwards than it would otherwise be if chainstays were connected lower to said seat tube, this can help with small bump compliance and it can also help reducing pedal bob, as chain tension can work against the suspension movement of said rear wheel suspension system in this configuration.

In one embodiment of said rear wheel suspension system, said one or more stiffness adjustment inserts have their widths extending at least essentially between the left and right edge of said leaf spring.

Thus, an adjustable rear wheel suspension system is provided that does not roll excessively to the sides when the rider is pedaling or maneuvering.

Figure 32:
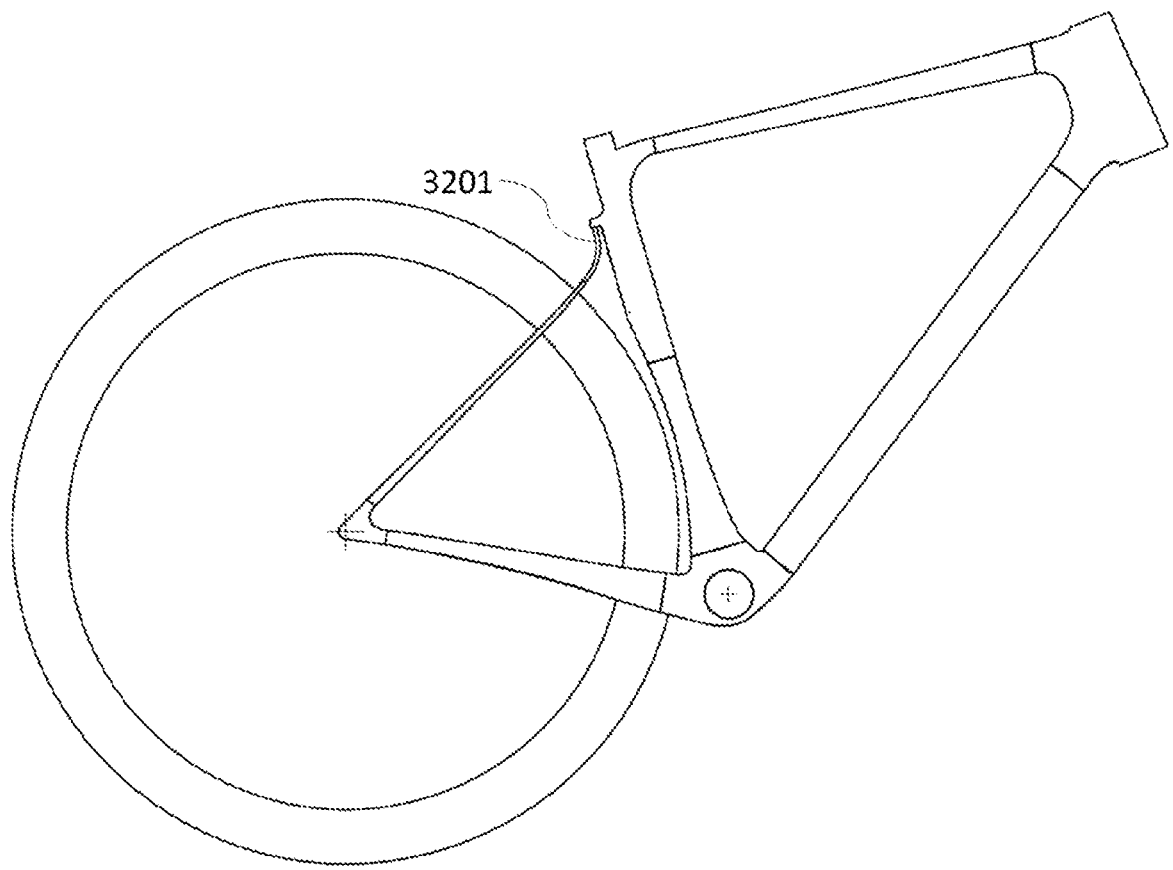

FIG. 32 shows an example of an embodiment of said rear wheel suspension system, where said leaf spring 3201 is relatively short, but still falling under the scope of the present invention.

Figure 33:
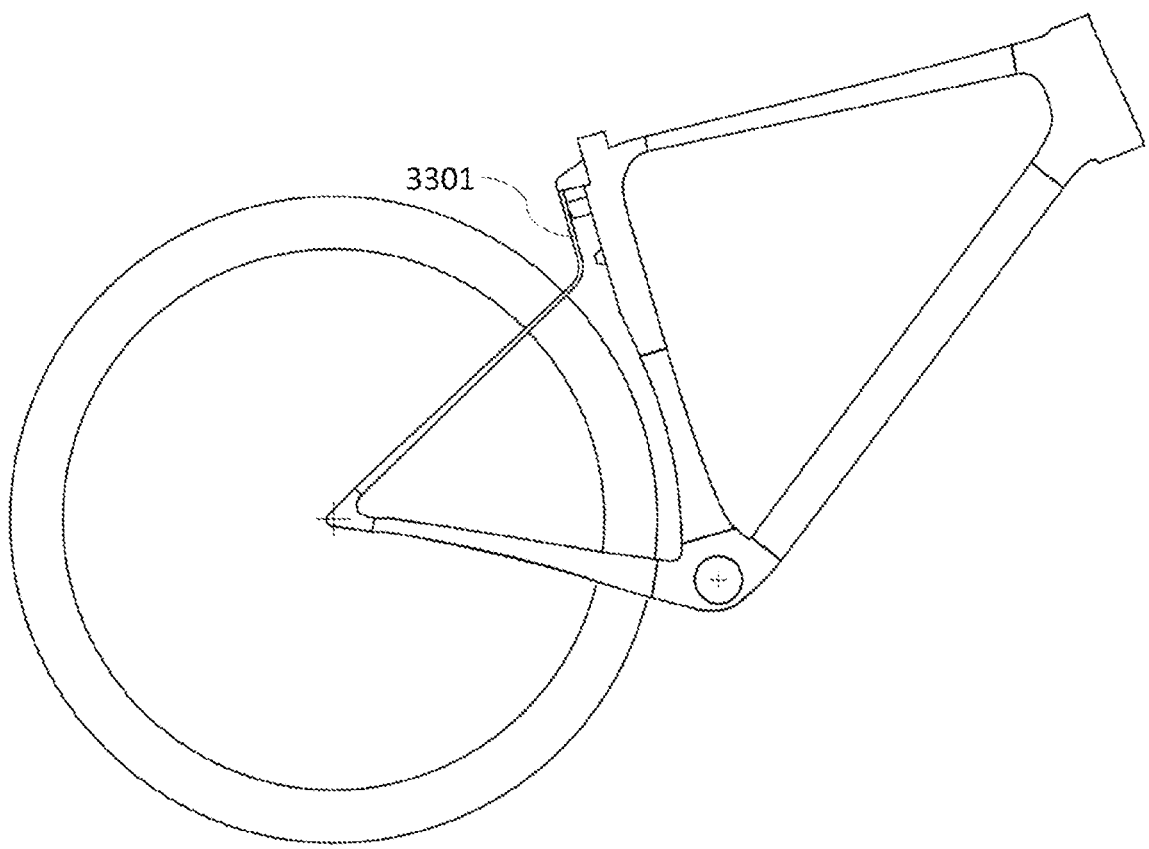

FIG. 33 shows an example of an embodiment of said rear wheel suspension system, where said leaf spring 3301 is relatively long, but still falling under the scope of the present invention.

Figure 34:
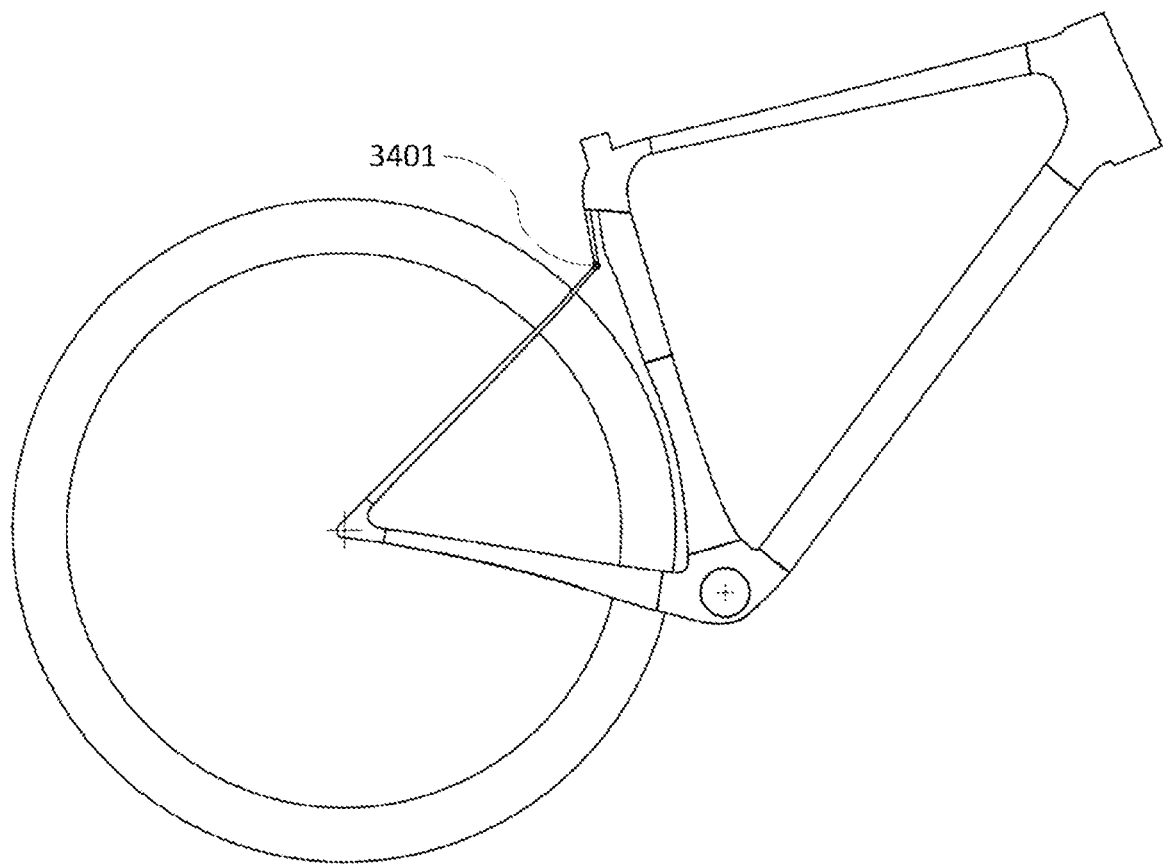

FIG. 34 shows an embodiment of said rear wheel suspension system, where said leaf spring and said left and right seat stays are interconnected via a pivot 3401.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A rear wheel suspension system for a bike, the bike comprising:
a rear wheel with a maximum radius, the rear wheel defining a center plane perpendicular to a rotational axis of the rear wheel and coincident with a ground contact of the rear wheel when said bike is upright on level ground,
the rear wheel suspension system comprising:
a seat tube,
a bottom bracket shell defining a rotational axis extending there through in direction transverse to the center plane, said bottom bracket shell forming part of or being securely fixed to said seat tube,
a left side flexible chainstay and a right side flexible chainstay, extending longitudinally on either side of said center plane, each of said chainstays having a forward end configured for attaching to a lower portion of the seat tube of said bike less than 250 mm from said rotational axis of the bottom bracket shell,
a left side seatstay and a right side seatstay, each having lower end areas connected to posterior end areas of each of said flexible chainstays, and each of said seatstays extending upwardly and forwardly with an opposite end being configured to extend to a position which is outside of the maximum radius of the rotably attached rear wheel and at a distance from an upper portion of said seat tube of said bike,
a set of dropouts located where said flexible chainstays and said seatstays interconnect for rotably supporting said rear wheel of said bike,
a leaf spring interconnecting said seatstays and said seat tube,
wherein one end of the leaf spring is connected to the upper end area of said seatstays, and
wherein the leaf spring extends upwardly from a point of connection to the upper end area of the seatstays to a point of connection to said seat tube of said bike, said leaf spring defining opposite top and bottom surfaces extending transversely to said center plane,
wherein the said leaf spring is arranged at a distance D to the seat tube in a direction perpendicular to said top and bottom surfaces of the leaf spring to allow flex of said leaf spring towards said seat tube and thus vertical flex of said flexible chainstays,
wherein the rear wheel suspension system comprises one or more stiffness adjustment inserts, arranged and secured in place between said leaf spring and said seat tube,
wherein one or more of said one or more stiffness adjustment inserts are any of: slidable upwards and downwards along and between said leaf spring and seat tube, and elevatable substantially perpendicularly to said top and bottom surfaces of said leaf spring, so as to adjust an effective spring length of the leaf spring.

2. The rear wheel suspension system according to claim 1, where said left side flexible chainstay and said right side flexible chainstay, said left side seatstay and said right side seatstay, said leaf spring and said seat tube of said rear wheel suspension system are all a part of the same non-disassemblable body.

3. The rear wheel suspension system according to claim 1, where said seatstays are at least 30% thinner on average in a majority of their upmost lengthwise third than a lower at least $\frac{2}{3}^{rd}$ lengthwise remainder of said seatstays are on average.

4. The rear wheel suspension system according to claim 1, where said seat tube and said leaf spring are formed so that an effective spring length of said leaf spring is shortened as the said rear wheel suspension system compresses, by said leaf spring coming into contact with said seat tube at designated one or more locations.

5. The rear wheel suspension system according to claim 1, where more than 30% of a length of said top and bottom surfaces of said leaf spring is at any given location less than 12° from being parallel to said seat tube of said bike.

6. The rear wheel suspension system according to claim 1, where said top and bottom surfaces of said leaf spring are substantially parallel to an adjacent surface of said seat tube on a lengthwise portion of said leaf spring that reaches from where said leaf spring and said seat tube connect, at a root of said leaf spring, to a portion at least 30% downwards along the length of said leaf spring, in this said substantially parallel lengthwise portion of said leaf spring a substantially perpendicular distance E between said leaf spring and said seat tube being between 1 mm and 40 mm, such as 5-20 mm.

7. The rear wheel suspension system according to claim 1, where said one or more slidable stiffness adjustment inserts are guided to prevent lateral movement.

8. The rear wheel suspension system according to claim 7, where one or more of said one or more slidable stiffness adjustment inserts comprise a mechanically gripping texture A that interacts with a matching opposing mechanically gripping texture B on said leaf spring and/or on said seat tube, said one or more mechanically gripping slidable stiffness adjustment inserts further comprising means of pressuring said opposing mechanically gripping textures A and B together.

9. The rear wheel suspension system according to claim 7, comprising a linear actuator for sliding one or more of said one or more slidable stiffness adjustment inserts upwardly and downwardly.

10. The rear wheel suspension system according to claim 9, where said linear actuator is arranged in a groove that runs up and down the posterior surface of said seat tube, said one or more of said one or more slidable stiffness adjustment inserts have an extrusion shaped to interact laterally with the surface of said groove.

11. The rear wheel suspension system according to claim 9, where there is a hole up into a root of said leaf spring that provides linear actuators that reach upwards from said one or more of said one or more slidable stiffness adjustment inserts with access to added space above where said leaf spring reaches said seat tube.

12. The rear wheel suspension system according to claim 1, where one or more of said one or more stiffness adjustment inserts are formed so that a thickness of said one or more of said one or more stiffness adjustment inserts at the end of the leaf spring that is closer to a root of said leaf spring is such that, when rider is stationary in riding position on said bike, it reaches entirely between said leaf spring and said seat tube, while a thickness at the end of the leaf spring further away from the root of said leaf spring is such that it lacks up to 5 mm to reach entirely between said leaf spring and seat tube.

13. A bike comprising:
   a rear wheel with a maximum radius, the rear wheel defining a center plane perpendicular to a rotational axis of the rear wheel and coincident with the ground contact of the rear wheel when said bike is upright on level ground, and
   a rear wheel suspension system according to claim 1.

14. A rear wheel suspension system for a bike, the bike including a rear wheel with a maximum radius, the rear wheel defining a center plane perpendicular to a rotational axis of the rear wheel and coincident with a ground contact of the rear wheel when said bike is upright on level ground, the rear wheel suspension system comprising:
   a seat tube,
   a bottom bracket shell defining a rotational axis extending there through in direction transverse to the center plane, said bottom bracket shell forming part of or being securely fixed to said seat tube,
   a left side flexible chainstay and a right side flexible chainstay, extending longitudinally on either side of said center plane, each of said chainstays having a forward end configured for attaching to a lower portion of the seat tube of said bike less than 250 mm from said rotational axis of the bottom bracket shell,
   a left side seatstay and a right side seatstay, each having lower end areas connected to posterior end areas of each of said flexible chainstays, and each of said seatstays extending upwardly and forwardly with an opposite end being configured to extend to a position which is outside of the maximum radius of the rotably attached rear wheel and at a distance from an upper portion of said seat tube of said bike,
   a set of dropouts located where said flexible chainstays and said seatstays interconnect for rotably supporting said rear wheel of said bike, and
   a leaf spring interconnecting said seatstays and said seat tube,
   wherein one end of the leaf spring is connected to the upper end area of said seatstays, and
   wherein the leaf spring extends upwardly from a point of connection to the upper end area of the seatstays to a point of connection to said seat tube of said bike, said leaf spring defining opposite top and bottom surfaces extending transversely to said center plane,
   wherein the said leaf spring is arranged at a distance D to the seat tube in a direction perpendicular to said top and bottom surfaces of the leaf spring to allow flex of said leaf spring towards said seat tube and thus vertical flex of said flexible chainstays,
   wherein the rear wheel suspension system further comprises one or more stiffness adjustment inserts, arranged and secured in place between said leaf spring and said seat tube,
   wherein one or more of said one or more stiffness adjustment inserts are elevatable substantially perpendicularly to said top and bottom surfaces of said leaf spring,
   wherein one or more of said one or more stiffness adjustment inserts are slidable upwards and downwards along and between said leaf spring and said seat tube, said one or more slidable stiffness adjustment inserts being guided to prevent lateral movement,
   wherein the rear wheel suspension system further comprises a linear actuator for sliding one or more of said one or more slidable stiffness adjustment inserts upwardly and downwardly,
   wherein said linear actuator is arranged in a groove that runs up and down the posterior surface of said seat tube, said one or more of said one or more slidable stiffness adjustment inserts have an extrusion shaped to interact laterally with the surface of said groove.

15. The rear wheel suspension system according to claim 14, further comprising a hole up into a root of said leaf spring that provides linear actuators that reach upwards from said one or more of said one or more slidable stiffness adjustment inserts with access to added space above where said leaf spring reaches said seat tube.

16. A rear wheel suspension system for a bike, the bike including a rear wheel with a maximum radius, the rear wheel defining a center plane perpendicular to a rotational axis of the rear wheel and coincident with a ground contact of the rear wheel when said bike is upright on level ground, the rear wheel suspension system comprising:
   a seat tube,
   a bottom bracket shell defining a rotational axis extending there through in direction transverse to the center plane, said bottom bracket shell forming part of or being securely fixed to said seat tube,
   a left side flexible chainstay and a right side flexible chainstay, extending longitudinally on either side of said center plane, each of said chainstays having a forward end configured for attaching to a lower portion of the seat tube of said bike less than 250 mm from said rotational axis of the bottom bracket shell,
   a left side seatstay and a right side seatstay, each having lower end areas connected to posterior end areas of each of said flexible chainstays, and each of said seatstays extending upwardly and forwardly with an opposite end being configured to extend to a position which is outside of the maximum radius of the rotably attached rear wheel and at a distance from an upper portion of said seat tube of said bike,
   a set of dropouts located where said flexible chainstays and said seatstays interconnect for rotably supporting said rear wheel of said bike, and
   a leaf spring interconnecting said seatstays and said seat tube, wherein one end of the leaf spring is connected to the upper end area of said seatstays, and wherein the leaf spring extends upwardly from a point of connection to the upper end area of the seatstays to a point of connection to said seat tube of said bike, said leaf spring defining opposite top and bottom surfaces extending transversely to said center plane, wherein the said leaf spring is arranged at a distance D to the seat tube in a direction perpendicular to said top and bottom surfaces of the leaf spring to allow flex of said leaf spring towards said seat tube and thus vertical flex of said flexible chainstays, wherein more than 30% of a length of said top and bottom surfaces of said leaf spring is at any given location less than 12° from being parallel to said seat tube of said bike.

17. The rear wheel suspension system according to claim 16, where the rear wheel suspension system comprises one or more stiffness adjustment inserts, arranged and secured in place between said leaf spring and said seat tube.

18. The rear wheel suspension system according to claim 17, where one or more of said one or more stiffness adjustment inserts are elevatable substantially perpendicularly to said top and bottom surfaces of said leaf spring.

* * * * *

UNITED STATES PATENT AND TRADEMARK OFFICE
CERTIFICATE OF CORRECTION

PATENT NO. : 12,275,485 B2
APPLICATION NO. : 17/777468
DATED : April 15, 2025
INVENTOR(S) : Benedikt Skulason and Bergur Benediktsson Page 1 of 1

It is certified that error appears in the above-identified patent and that said Letters Patent is hereby corrected as shown below:

In the Claims

Column 22, Line 55 ", such as 5-20 mm" should be removed.

Signed and Sealed this
Twenty-fourth Day of June, 2025

Coke Morgan Stewart
*Acting Director of the United States Patent and Trademark Office*